United States Patent
Yamasaki et al.

(10) Patent No.: US 6,572,771 B2
(45) Date of Patent: Jun. 3, 2003

(54) WASTE WATER TREATMENT METHOD

(75) Inventors: Kazuyuki Yamasaki, Hiroshima (JP); Kazumi Chujo, Ayauta-gun (JP); Seiji Okamoto, Fukuyama (JP); Yukihiro Tao, Fukuyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/160,183

(22) Filed: Jun. 4, 2002

(65) Prior Publication Data

US 2002/0144940 A1 Oct. 10, 2002

Related U.S. Application Data

(62) Division of application No. 09/493,180, filed on Jan. 28, 2000, now Pat. No. 6,413,417.

(30) Foreign Application Priority Data

Jan. 28, 1999 (JP) .......................................... 11-019824

(51) Int. Cl.$^7$ ................................................. C02F 1/56
(52) U.S. Cl. .................. 210/605; 210/624; 210/631; 210/638; 210/639; 210/650; 210/651; 210/695; 210/713; 210/725; 210/727; 210/908; 210/911; 210/915; 210/919
(58) Field of Search ............................. 210/711, 713, 210/714, 715, 724, 725, 726, 727, 911, 912, 915, 919, 605, 624, 631, 638, 639, 650, 651, 695, 908

(56) References Cited

U.S. PATENT DOCUMENTS 3,738,932 A * 6/1973 Kostenbader ............... 210/713
5,156,746 A 10/1992 Maree et al. ............... 210/712
5,427,691 A * 6/1995 Kuyucak et al. ........... 210/713
5,480,537 A 1/1996 Yamasaki et al. .......... 210/96.1
5,578,214 A 11/1996 Yamasaki et al. .......... 210/650
5,580,458 A 12/1996 Yamasaki et al. .......... 210/609
5,702,594 A 12/1997 Yamasaki et al. .......... 210/151
5,750,033 A 5/1998 Ikeda et al. ................ 210/711
5,824,227 A 10/1998 Cargnel et al. ............ 210/713
5,910,251 A 6/1999 Allen et al. ................ 210/638
6,063,279 A 5/2000 Yamasaki et al. .......... 210/605
6,413,417 B1 * 7/2002 Yamasaki et al. .......... 210/151

OTHER PUBLICATIONS

Patent Abstracts of Japan, 08309379 A, Nov. 26, 1995.
Patent Abstracts of Japan, 10113679 A, May 6, 1998.

* cited by examiner

*Primary Examiner*—Peter A. Hruskoci
(74) *Attorney, Agent, or Firm*—Nixon & Vanderhye PC

(57) ABSTRACT

An apparatus for treatment of fluorine waste water has an introduction tank, a main treatment tank, a calcium hydroxide tank, a polychlorinated aluminum tank, a macromolecular flocculant tank, a settling tank, and a concentration tank. Fluorine waste water is introduced through the introduction tank into a lower part of the main treatment tank through a lower inlet pipe. Also, return sludge from the concentration tank and silicon sludge from a silicon waste water treatment system are introduced into an upper part of the main treatment tank. Thus, silicon recovered from silicon waste water is recycled for treatment of fluorine waste water. Also, unreacted chemicals, which have been loaded in the calcium hydroxide tank, polychlorinated aluminum tank, macromolecular flocculant tank, are recycled. The main treatment tank has no stirrer, and thus conserves electrical energy, but can neutralize the waste water.

21 Claims, 24 Drawing Sheets

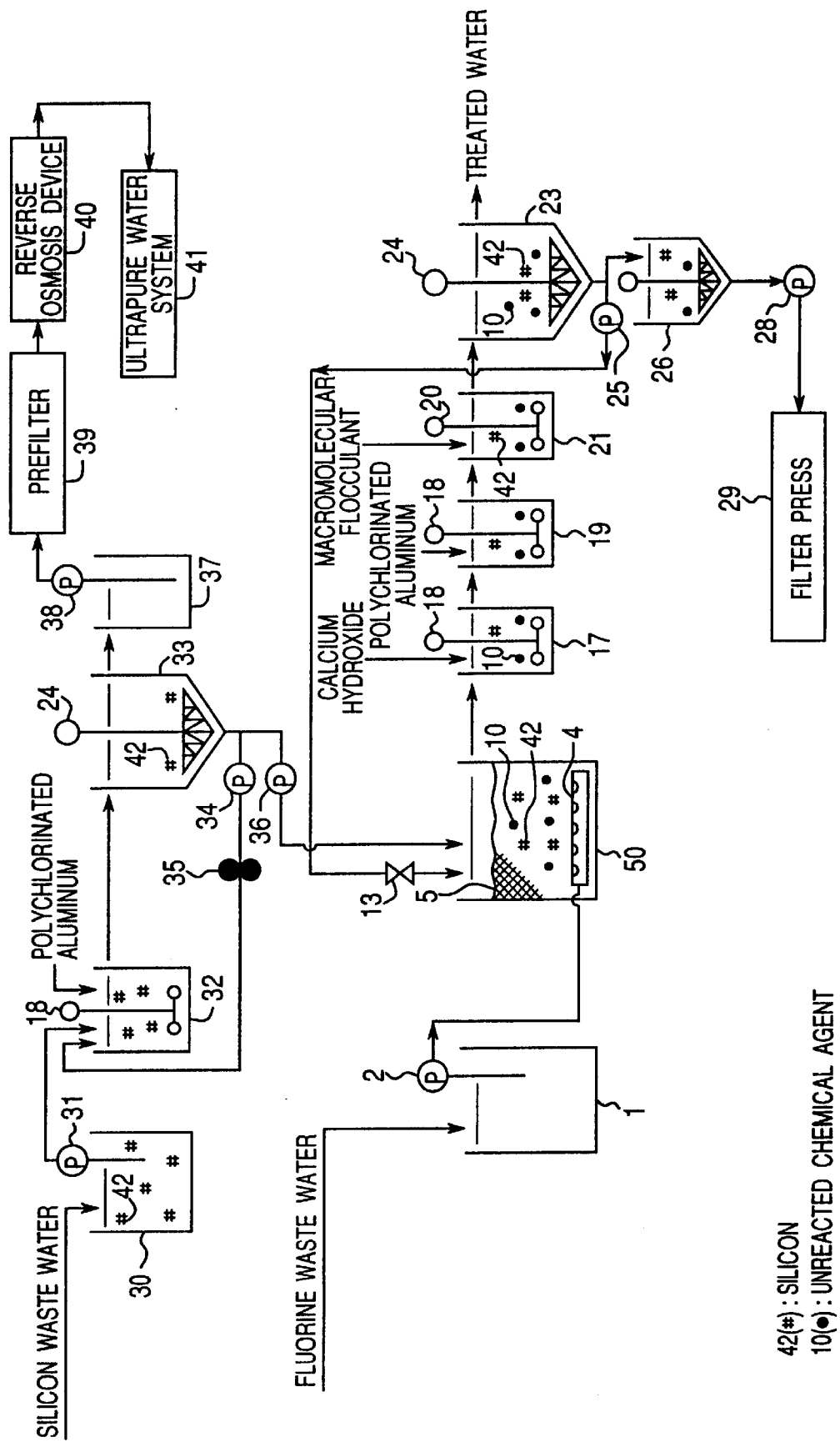

Fig.3A

| NAME OF TANK | RESIDENCE TIME [HR.] | TIMING (TIME ELAPSED) [HR.] | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| INTRODUCTION TANK | 1 | — | | | | | | | | | | | | | | |
| MAIN TREATMENT TANK (ANAEROBIC TANK) | 2 | | —— | | | | | | | | | | | | | |
| CALCIUM HYDROXIDE TANK | 1/3 | | | | — | | | | | | | | | | | |
| POLYCHLORINATED ALUMINUM TANK | 1/3 | | | | — | | | | | | | | | | | |
| MACROMOLECULAR FLOCCULANT TANK | 1/3 | | | | | — | | | | | | | | | | |
| SETTLING TANK | 3 | | | | | —— | | | | | | | | | | |
| CONCENTRATION TANK | 5 | | | | | | | —— | —— | | | | | | | |
| STORAGE TANK 30 | 1/2 | — | | | | | | | | | | | | | | |
| REACTION TANK 32 | 1/2 | — | | | | | | | | | | | | | | |
| SETTLING TANK 33 | 3 | | —— | | | | | | | | | | | | | |
| STORAGE TANK 37 | 1/2 | | | | — | | | | | | | | | | | |

Fig.3B

| NAME OF TANK | RESIDENCE TIME [HR.] | TIMING (TIME ELAPSED) [HR.] | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| INTRODUCTION TANK | 1 | ├─┤ | | | | | | | | | | | | | |
| MAIN TREATMENT TANK (ANAEROBIC TANK) | 1 | | ├─┤ | | | | | | | | | | | | |
| CALCIUM HYDROXIDE TANK | 1/3 | | | ╿ | | | | | | | | | | | |
| POLYCHLORINATED ALUMINUM TANK | 1/3 | | | ╿ | | | | | | | | | | | |
| MACROMOLECULAR FLOCCULANT TANK | 1/3 | | | ╿ | | | | | | | | | | | |
| SETTLING TANK | 3 | | | | ├──┤ | | | | | | | | | | |
| CONCENTRATION TANK | 5 | | | | | | | ├────┤ | | | | | | | |
| STORAGE TANK 30 | 1/2 | ╿ | | | | | | | | | | | | | |
| REACTION TANK 32 | 1/2 | | ╿ | | | | | | | | | | | | |
| SETTLING TANK 33 | 3 | | ├──┤ | | | | | | | | | | | | |
| STORAGE TANK 37 | 1/2 | | | | | ╿ | | | | | | | | | |

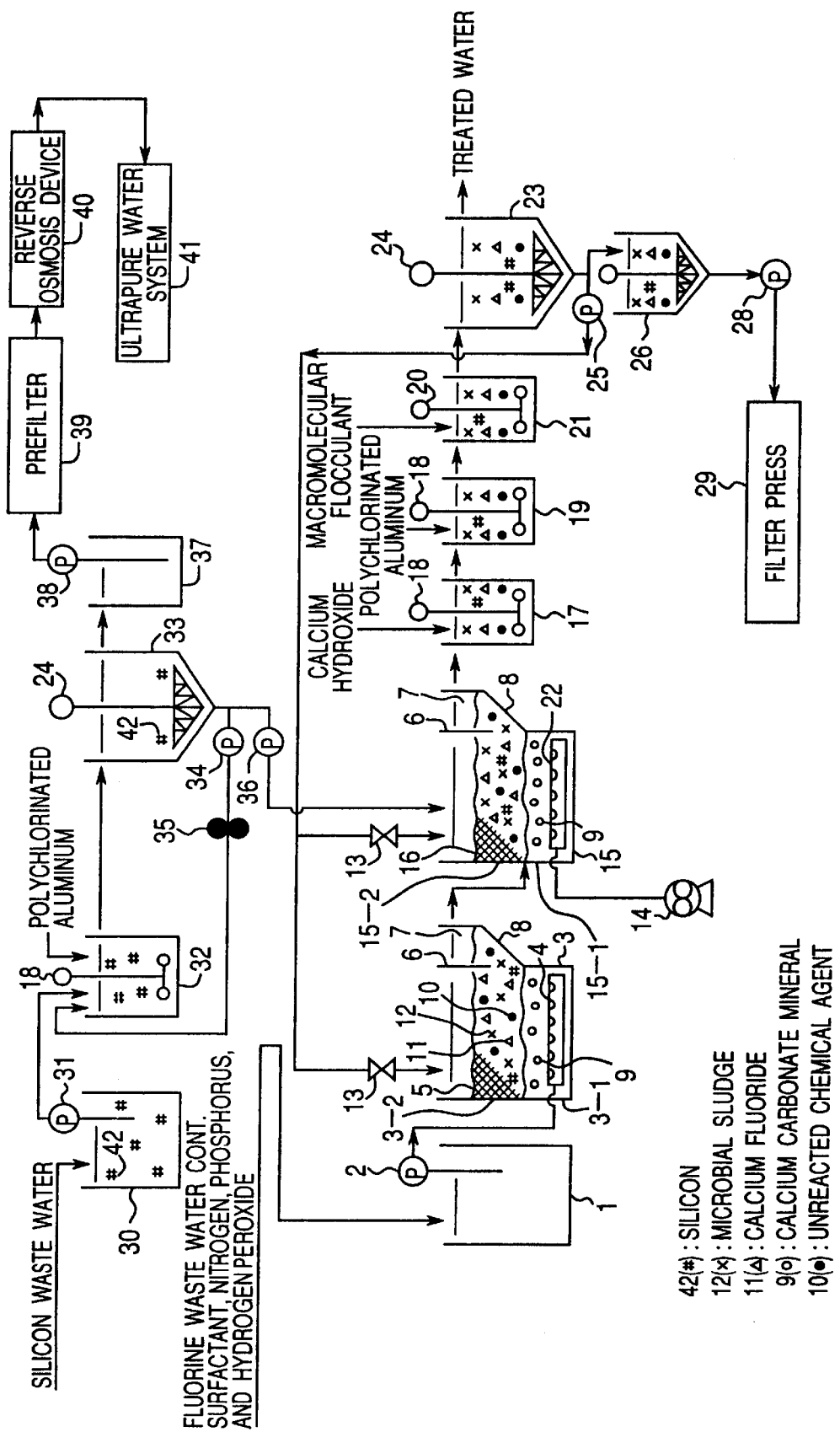

Fig.8A

| NAME OF TANK | RESIDENCE TIME [HR.] | TIMING (TIME ELAPSED) [HR.] | | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| INTRODUCTION TANK | 1 | — | | | | | | | | | | | | | | |
| ANAEROBIC TANK | 2 | | —— | | | | | | | | | | | | | |
| AEROBIC TANK | 2 | | | | —— | | | | | | | | | | | |
| CALCIUM HYDROXIDE TANK | 1/3 | | | | | | ⌐ | | | | | | | | | |
| POLYCHLORINATED ALUMINUM TANK | 1/3 | | | | | | — | | | | | | | | | |
| MACROMOLECULAR FLOCCULANT TANK | 1/3 | | | | | | | ⌐ | | | | | | | | |
| SETTLING TANK | 3 | | | | | | | —— | | | | | | | | |
| CONCENTRATION TANK | 5 | | | | | | | | | | ——— | | | —— | | |
| STORAGE TANK 30 | 1/2 | — | | | | | | | | | | | | | | |
| REACTION TANK 32 | 1/2 | — | | | | | | | | | | | | | | |
| SETTLING TANK 33 | 3 | | | —— | | ⌐ | | | | | | | | | | |
| STORAGE TANK 37 | 1/2 | | | | | | | | | | | | | | | |

Fig.8B

| NAME OF TANK | RESIDENCE TIME [HR.] | TIMING (TIME ELAPSED) [HR.] | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| INTRODUCTION TANK | 1 | — | | | | | | | | | | | | | | |
| ANAEROBIC TANK | 1 | | — | | | | | | | | | | | | | |
| AEROBIC TANK | 1 | | | — | | | | | | | | | | | | |
| CALCIUM HYDROXIDE TANK | 1/3 | | | | — | | | | | | | | | | | |
| POLYCHLORINATED ALUMINUM TANK | 1/3 | | | | — | | | | | | | | | | | |
| MACROMOLECULAR FLOCCULANT TANK | 1/3 | | | | — | | | | | | | | | | | |
| SETTLING TANK | 3 | | | | | —— | | | | | | | | | | |
| CONCENTRATION TANK | 5 | | | | | | | | ———— | | | | | | | |
| STORAGE TANK 30 | 1/2 | — | | | | | | | | | | | | | | |
| REACTION TANK 32 | 1/2 | | — | | | | | | | | | | | | | |
| SETTLING TANK 33 | 3 | | | —— | | | | | | | | | | | | |
| STORAGE TANK 37 | 1/2 | | | | | — | | | | | | | | | | |

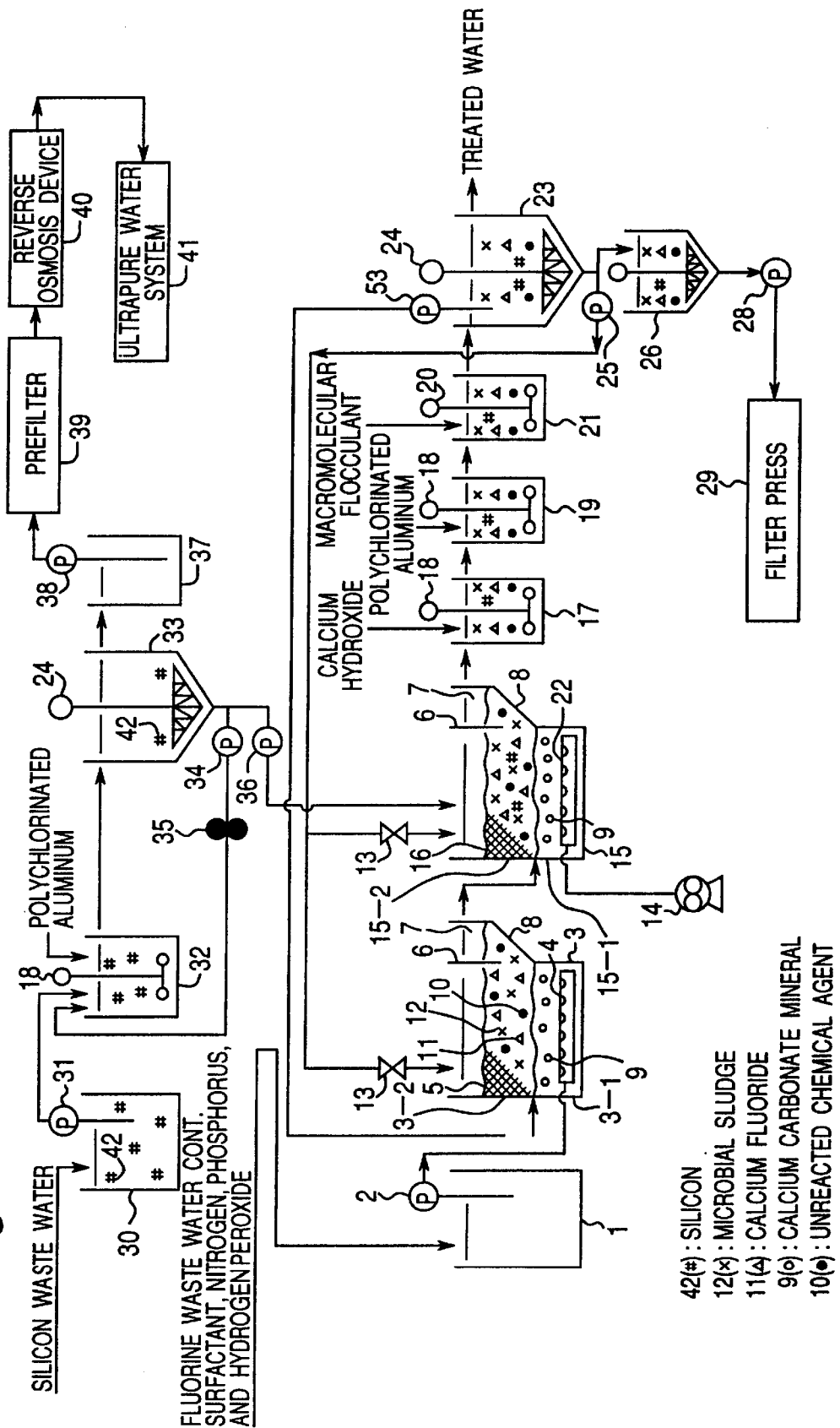

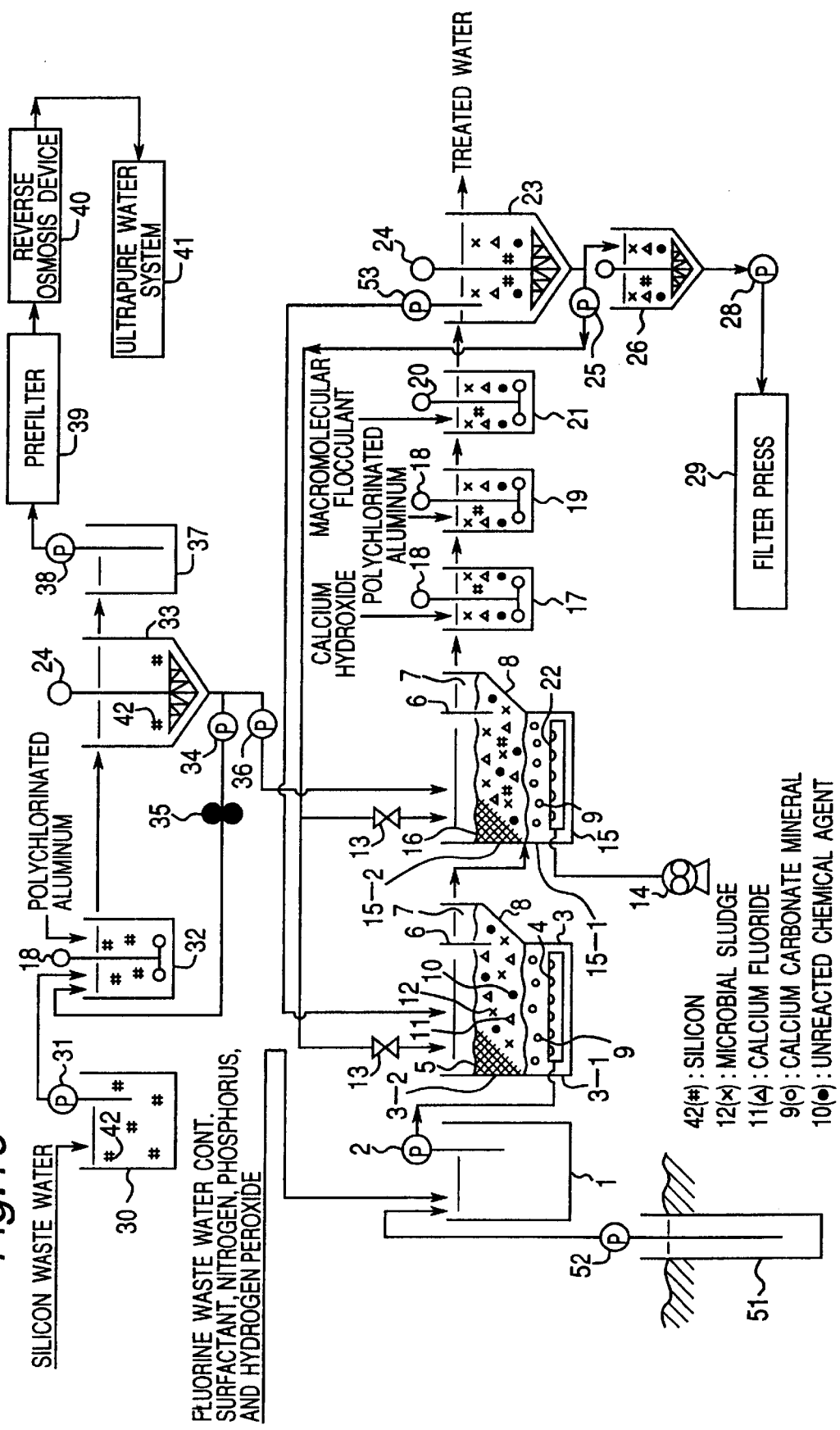

Fig.12A

| NAME OF TANK | RESIDENCE TIME [HR.] | TIMING (TIME ELAPSED) [HR.] | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| INTRODUCTION TANK | 1 | — | | | | | | | | | | | | | | |
| MAIN TREATMENT TANK (ANAEROBIC TANK) | 2 | | — | — | | | | | | | | | | | | |
| CALCIUM HYDROXIDE TANK | 1/3 | | | | — | | | | | | | | | | | |
| POLYCHLORINATED ALUMINUM TANK | 1/3 | | | | — | | | | | | | | | | | |
| MACROMOLECULAR FLOCCULANT TANK | 1/3 | | | | | — | | | | | | | | | | |
| SETTLING TANK | 3 | | | | | — | — | — | | | | | | | | |
| CONCENTRATION TANK | 5 | | | | | | | — | — | — | — | — | | | | |
| STORAGE TANK 30 | 1/2 | — | | | | | | | | | | | | | | |
| STORAGE TANK 37 | 1/2 | — | | | | | | | | | | | | | | |

Fig.12B

| NAME OF TANK | RESIDENCE TIME [HR.] | TIMING (TIME ELAPSED) [HR.] | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| INTRODUCTION TANK | 1 | — | | | | | | | | | | | | | | |
| MAIN TREATMENT TANK (ANAEROBIC TANK) | 1 | | — | | | | | | | | | | | | | |
| CALCIUM HYDROXIDE TANK | 1/3 | | | — | | | | | | | | | | | | |
| POLYCHLORINATED ALUMINUM TANK | 1/3 | | | — | | | | | | | | | | | | |
| MACROMOLECULAR FLOCCULANT TANK | 1/3 | | | | — | | | | | | | | | | | |
| SETTLING TANK | 3 | | | | | — | — | | | | | | | | | |
| CONCENTRATION TANK | 5 | | | | | | | — | — | | | | | | | |
| STORAGE TANK 30 | 1/2 | | | | | | | | | | | — | | | | |
| STORAGE TANK 37 | 1/2 | — | | | | | | | | | | | | | | |

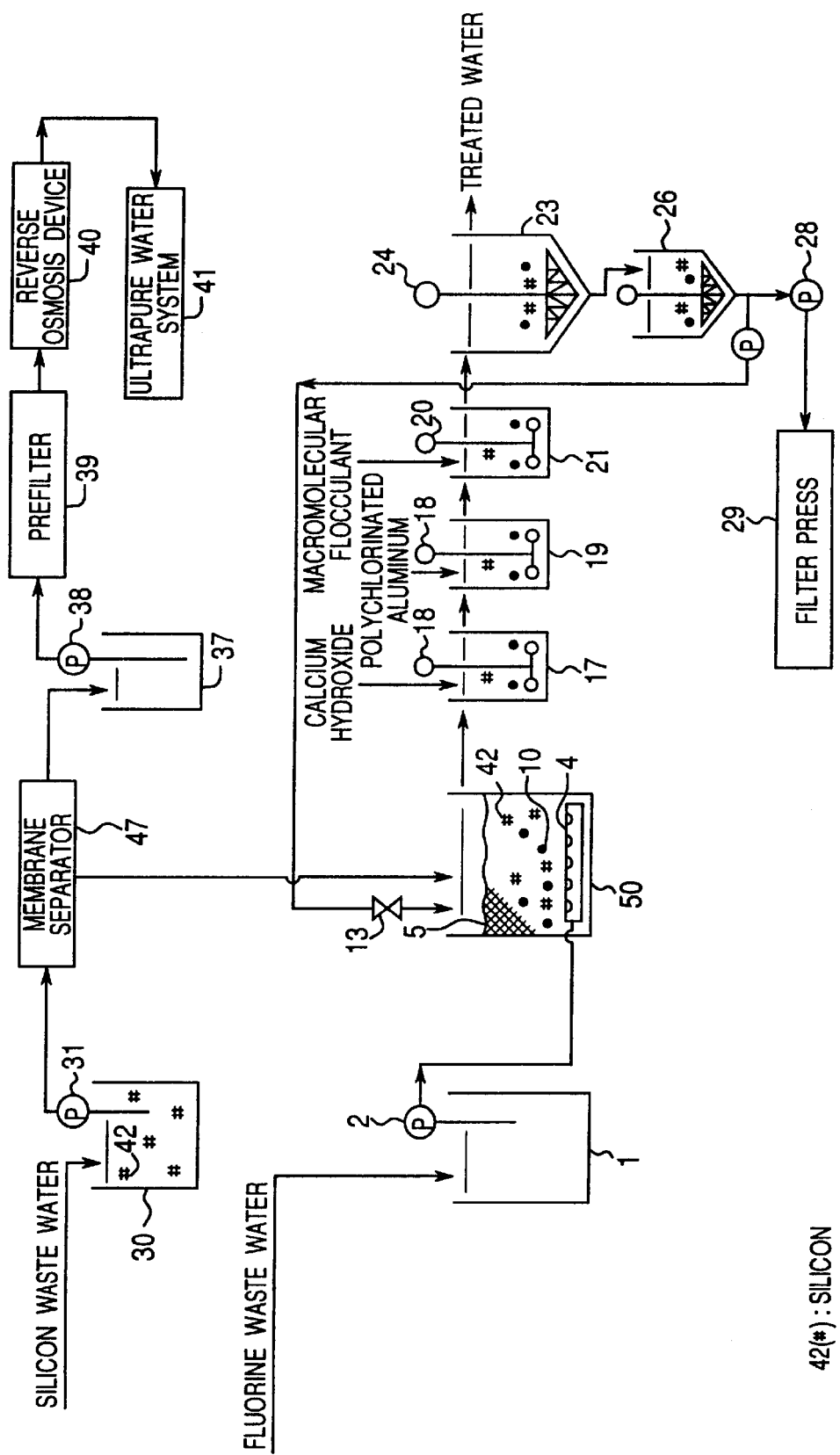

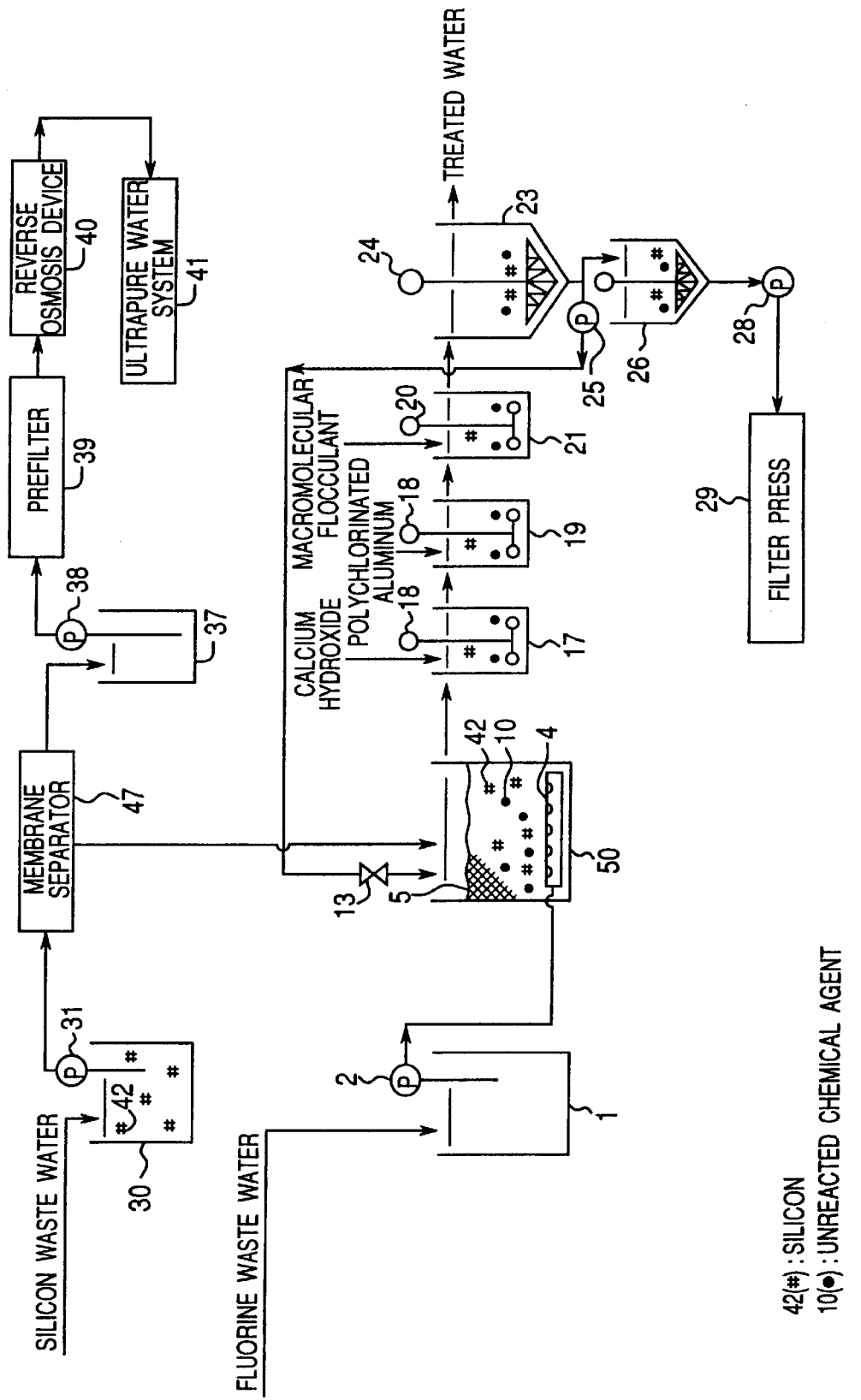

Fig. 17A

| NAME OF TANK | RESIDENCE TIME [HR.] | TIMING (TIME ELAPSED) [HR.] | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| INTRODUCTION TANK | 1 | — | | | | | | | | | | | | | |
| ANAEROBIC TANK | 2 | | — | — | | | | | | | | | | | |
| AEROBIC TANK | 2 | | | | — | — | | | | | | | | | |
| CALCIUM HYDROXIDE TANK | 1/3 | | | | | | — | | | | | | | | |
| POLYCHLORINATED ALUMINUM TANK | 1/3 | | | | | | — | | | | | | | | |
| MACROMOLECULAR FLOCCULANT TANK | 1/3 | | | | | | | — | | | | | | | |
| SETTLING TANK | 3 | | | | | | | — | — | — | | | | | |
| CONCENTRATION TANK | 5 | | | | | | | | | | — | — | — | — | |
| STORAGE TANK 30 | 1/2 | — | | | | | | | | | | | | | |
| STORAGE TANK 37 | 1/2 | | — | | | | | | | | | | | | |

Fig.17B

| NAME OF TANK | RESIDENCE TIME [HR.] | TIMING (TIME ELAPSED) [HR.] | | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| INTRODUCTION TANK | 1 | — | | | | | | | | | | | | | | |
| ANAEROBIC TANK | 1 | | — | | | | | | | | | | | | | |
| AEROBIC TANK | 1 | | | — | | | | | | | | | | | | |
| CALCIUM HYDROXIDE TANK | 1/3 | | | — | | | | | | | | | | | | |
| POLYCHLORINATED ALUMINUM TANK | 1/3 | | | | — | | | | | | | | | | | |
| MACROMOLECULAR FLOCCULANT TANK | 1/3 | | | | — | | | | | | | | | | | |
| SETTLING TANK | 3 | | | | | — | | | | | | | | | | |
| CONCENTRATION TANK | 5 | | | | | | | — | | | | | | | | |
| STORAGE TANK 30 | 1/2 | — | | | | | | | | | | | | | | |
| STORAGE TANK 37 | 1/2 | | | | | | | | | | | | | — | | |

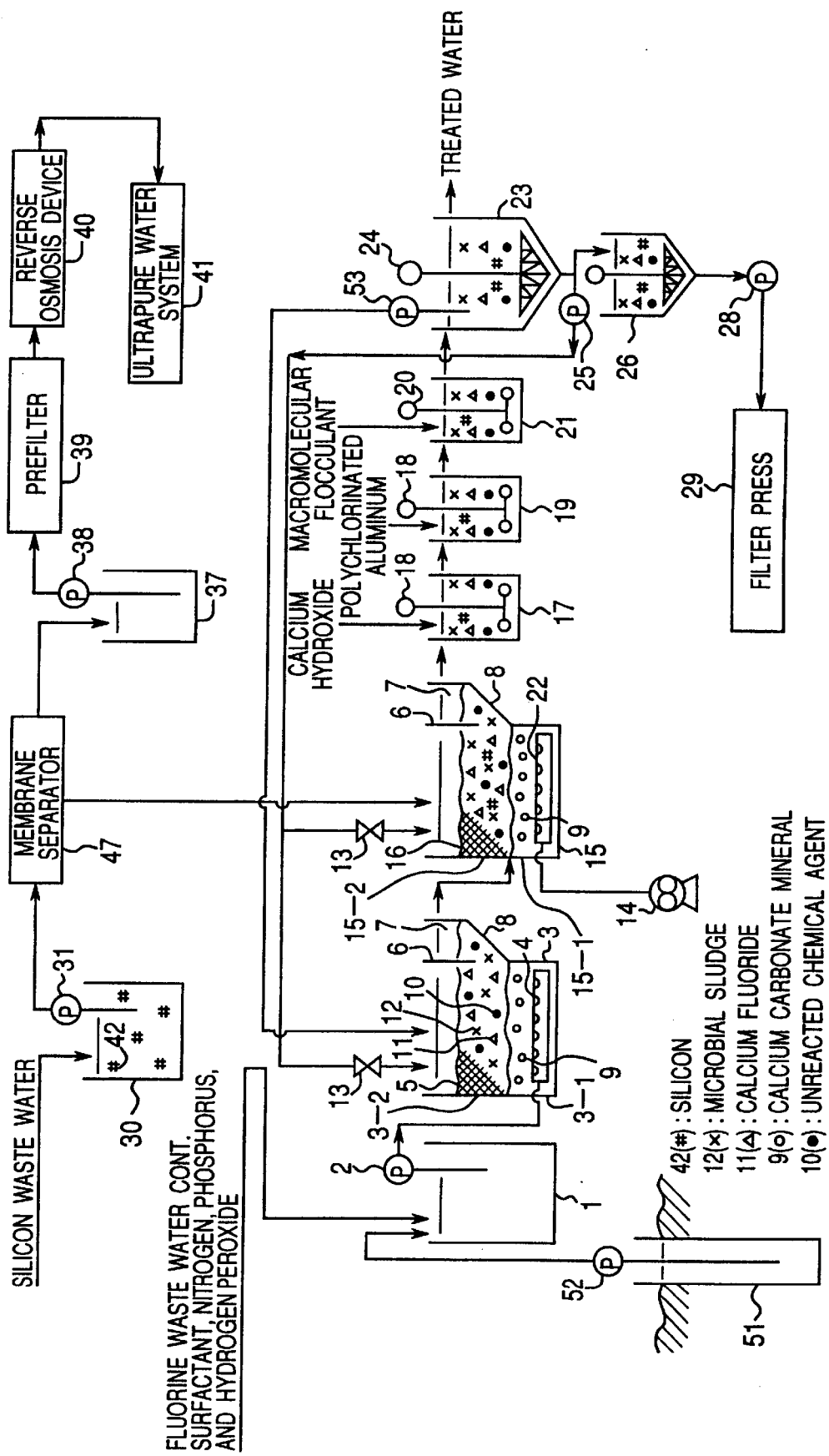

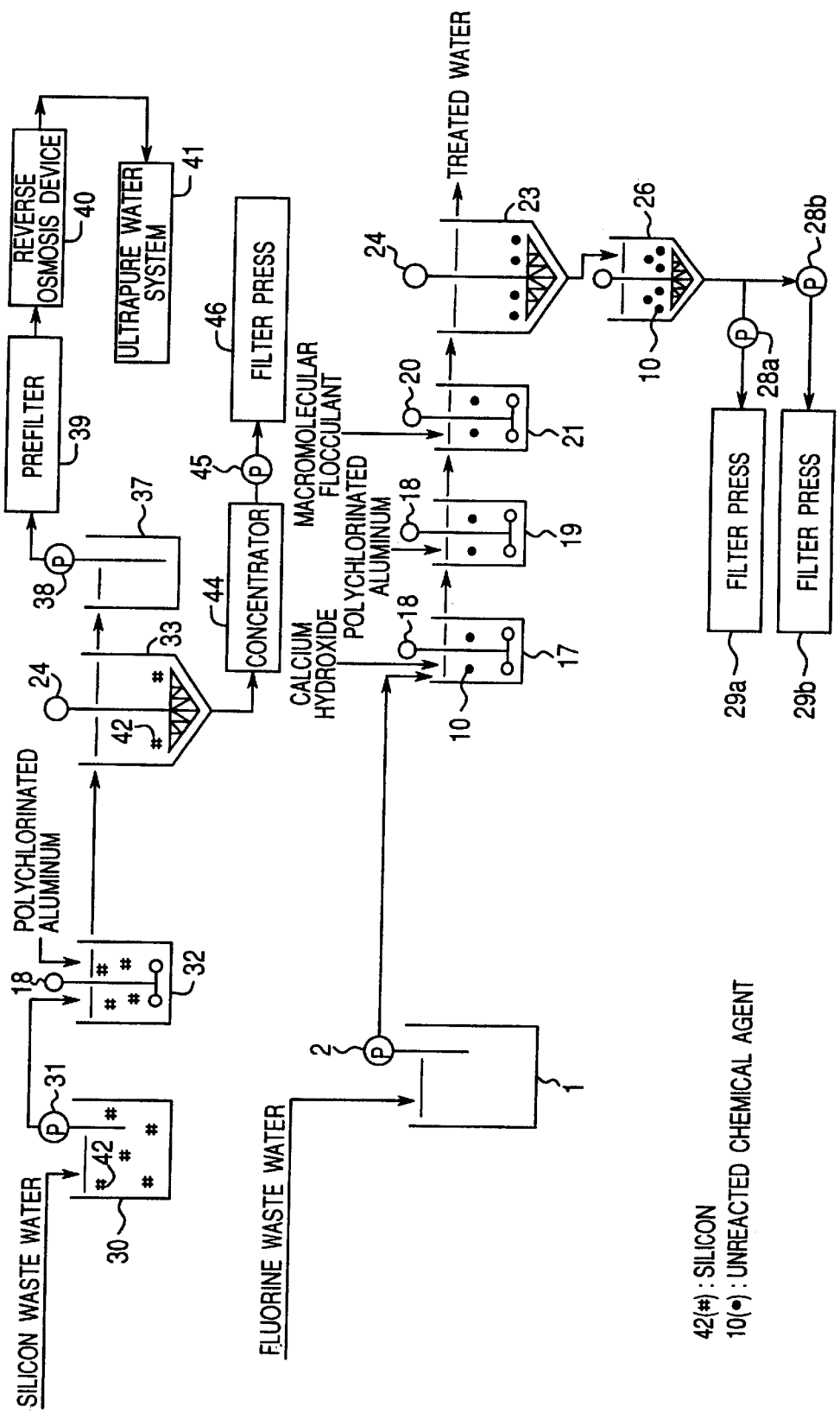

WASTE WATER TREATMENT METHOD

This application is a division of application Ser. No. 09/493,180, filed Jan. 28, 2000, now U.S. Pat. No. 6,413,417, the entire content of which is hereby incorporated by reference in this application.

BACKGROUND OF THE INVENTION

1. Field of the Invention

The present invention relates to a waste water treatment method and apparatus which utilizes silicon sludge obtained from silicon waster water, discharged from for example a semiconductor factory, for treating fluorine waster water in a separate waster water treatment system.

2. Description of the Related Art

In a semiconductor factory, after a silicon wafer is polished, it is cleaned with water. Thus, the factory has silicon waste water containing silicon particles.

Treated water derived from the silicon waste water, from which the silicon particles have been separated, has a high quality. Therefore, the treated water is discharged from the factory without being subjected to a further treatment or recycled as the raw water to be treated in an ultrapure water system.

On the other hand, the separated silicon particles exist in an aggregated form of sludge. The silicon sludge is dehydrated by a dehydrator and then disposed of, for example, as landfill, outside the semiconductor factory.

Japanese Patent Publication No. 2720830 discloses that silicon particles are recovered from a suspension which is a silicon particle-suspended calcium hydroxide solution, and that the recovered silicon particles are mixed with activated sludge to increase the settling performance of the activated sludge.

On the other hand, to treat fluorine waste water, hitherto, a calcium agent such as calcium hydroxide or calcium carbonate mineral is added or loaded to the waste water to chemically react fluorine contained in the waste water with calcium of the calcium agent, using a stirring means such as a stirrer or pneumatic stirring.

Conventionally, such stirring means has been infallibly used to cause a neutralization reaction of waste water and a chemical reaction of fluorine in the waste water. In those days not requiring complete implementation of energy-saving measures, however, the cost for electricity consumed by the stirring means was not regarded as important.

A conventional waste water treatment method is shown in FIG. 1B. In the conventional method, acid waste water is introduced into a neutralization tank 46 from an introduction tank 1 by a pump 2 and an alkali agent such as caustic soda is added to the waste water there. Then, the acid waste water loaded with the alkali agent is stirred by a rapid stirrer 18 to get neutralized.

FIG. 1C shows another conventional waste water treatment method. In FIG. 1C, parts similar to the parts shown in FIG. 1B are denoted by the same reference numerals. In the conventional method shown in FIG. 1C, acid waste water is pumped into a neutralization tank 46 from an introduction tank 1 by a pump 2. An alkali agent such as caustic soda is added to the acid waste water, and air generated by a blower 14 is discharged from an air-diffusing pipe 22 to neutralize the acid waste water by pneumatic stirring.

Returning to the treatment of fluorine waste water, fluorine waste water discharged from the semiconductor factory contains not only hydrofluoric acid which is a main component of the fluorine waste water but also nitric acid, ammonia water, phosphoric acid, hydrogen peroxide, and organic matters including a surfactant. Thus, it is necessary to also treat the latter components.

It is reported that a part of the surfactant may become an environmental hormone. Thus, reliable treatment is demanded.

Nitrogen and phosphorous resulting from the nitric acid, the ammonia water, and the phosphoric acid are considered to be substances causing eutrophication. Thus, it is necessary to treat nitrogen and phosphorus from the viewpoint of preventing red tide that is generated on the sea. In ordinary denitrifying equipment and phosphorus-removing equipment, however, the initial cost and the running cost are high.

In recent years, the pollution of ground water caused by an organic chlorine compound, or organic chloride, discharged from existing factories has been taken up as a serious problem. According to an ordinary method, the ground water containing the organic chloride is drawn up and aerated so that the vaporized organic chloride is adsorbed to activated charcoal. There is known another method in which the organic chloride is decomposed by being irradiated with ultraviolet light. According to another known method, the organic chloride is dechlorinated by its contact with a metal surface. According to still another known method, it is treated by microorganisms (bio-remediation).

Still another conventional method of treating the organic chloride is disclosed in Japanese Patent Application Laid-Open No. 10-113679. In the conventional method, silicon is added to a polluted environment to accelerate dechlorination reaction of the organic chlorides (contaminant), such as carbon tetrachloride, tetrachloroethylene, and the like, to thereby decompose it.

Examples of the conventional waste water treatment methods will be described below in more detail with reference to FIGS. 19 and 20 in which parts similar to the parts shown in FIGS. 1B and 1C are denoted by the same reference numerals.

In a first example of treating silicon waste water shown in FIG. 19, silicon and treated water are separated from each other by a coagulation and settlement method, and the treated water is utilized as raw water in an ultrapure water system.

In the method of treating silicon waste water shown in FIG. 19, silicon waste water is introduced into a storage tank 30 and stored therein and then fed to a reaction tank 32 by a storage tank pump 31. Polychlorinated aluminum (not shown) serving as a flocculating agent and caustic soda (not shown) serving as a neutralization agent are loaded into the reaction tank 32 to form flocs containing silicon 42. The silicon flocs are introduced into a settling tank 33 in which the flocs are separated into silicon as a solid matter and treated water as a supernatant liquid.

The treated water, supernatant, is introduced into a storage tank 37. Then, by a high-pressure pump 38, the treated water is fed to a prefilter 39, then to a reverse osmosis membrane device 40, and finally to a ultrapure water system 41 in which the water is utilized as raw water. On the other hand, the silicon floc that has precipitated in the settling tank 33 becomes silicon sludge. Then, a concentration 44 concentrates the silicon sludge. A filter press pump 45 feeds the concentrated silicon sludge to a filter press 46 for dehydration. After the silicon is dehydrated, it is disposed of as landfill, without being recycled, as described above. The disposal by landfill has been a typical method.

Fluorine waste water is treated by a different waste water treatment system. Fluorine waste water is introduced into an introduction tank 1 and then fed to a calcium hydroxide tank 17 by an introduction tank pump 2. Calcium hydroxide is added to the fluorine waste water contained in the calcium hydroxide tank 17 in which a rapid stirrer 18 stirs the fluorine waste water and the calcium hydroxide to mix and react them with each other. That is, calcium ions of the calcium hydroxide and fluorine contained in the fluorine waste water react with each other to form fine and refractory particles of calcium fluoride. The fine particles of calcium fluoride formed in the calcium hydroxide tank 17 are introduced into a polychlorinated aluminum tank 19 in which polychlorinated aluminum serving as a flocculating agent is added to the calcium fluoride to form flocs. Then, the flocs are introduced into a macromolecular flocculant tank 21 in which a macromolecular flocculant is added to the flocs to form larger stable flocs. Those flocs are introduced into a settling tank 23 in which the flocs are separated into a supernatant liquid and a precipitated matter, or sludge. The treated water, or the supernatant liquid, is discharged outside. The calcium fluoride sludge obtained as the precipitated matter is introduced into a concentration tank 26 and concentrated. Finally, the concentrated calcium fluoride sludge is fed to filter presses 29a and 29b by respective concentration tank pumps 28a and 28b for dehydration. The dehydrated sludge is disposed of by landfill.

The problem inherent in the above method for treating the fluorine waste water is that the concentrated sludge in the concentration tank 26 contain a lot of unreacted chemicals of calcium hydroxide, polychlorinated aluminum, and macromolecular flocculant so that the treatment of the sludge tends to fall into arrears unless two filter presses 29a and 29b are used for dehydration, as shown in FIG. 19.

The reason the concentrated sludge contains the unreacted chemical agents is that unless a large amount of chemical agents is used in the calcium hydroxide tank 17, the polychlorinated aluminum tank 19, and the macromolecular flocculant tank 21, the fluorine concentration of the treated water, namely, the supernatant liquid in the settling tank 23, does not drop to a predetermined value. Therefore, to maintain the quality of the treated water, a large amount of the chemical agents has been used so far.

Factories know the above fact experimentally and do not regard it as serious as far as the quality of the treated water is maintained. But nowadays, reducing the amount of waste is an evaluating point of an enterprise. Accordingly, it is necessary to improve the waste water treatment system in view of the reduction of waste and effective utilization of resources.

A second example of a conventional method of treating waste water shown in FIG. 20 is described in detail below. Similarly to the first example, in the second example, the silicon waste water and the fluorine waste water are separately treated, but the second example is different from the first example in the way of treating the silicon waste water. According to the second conventional method, silicon and treated water are separated from each other by a membrane separation method, and the treated water is utilized as the raw water in the ultrapure water system.

That is, in the second conventional example, the silicon waste water is introduced into a storage tank 30 and stored therein, and then, fed to a membrane separator 47 by a storage tank pump 31. The membrane separator 47 separates the silicon waste water into silicon and treated water securely. The separated treated water is introduced into a storage tank 37. Then, by a high-pressure pump 38, the treated water is fed to a prefilter 39, then to a reverse osmosis membrane device 40, and finally to a ultrapure water system 41 in which the water is utilized as raw water. On the other hand, the silicon-containing water that has not passed through the membrane is concentrated by a concentrator 44. A filter press pump 45 feeds silicon sludge resulting from the concentration to a filter press 46 by which the silicon sludge is dehydrated. Thus, according to the second example as well, the dehydrated silicon is disposed of by landfill without being recycled.

As described above, stirring means such as the stirrer and the pneumatic stirrer are required for neutralization and chemical reactions in the conventional waste water treatment methods. A power (electric power) is necessary for driving the stirring means.

Therefore, if the neutralization and chemical reactions can be accomplished without using the stirring means, saving of energy can be achieved. The saving of energy will be especially important in factories such as semiconductor factories and liquid crystal factories which generate large amounts of waste water and thus require large amounts of electricity to drive the stirring means and the blower, indispensable for the neutralization and chemical reactions but at high cost.

In the Kyoto conference on global warming (COP3: Third Session of the Conference of the Parties to the United Nations Framework Convention on Climate Change), attendants agreed to make positive energy-saving efforts. Implementation of energy saving is demanded in all kinds of equipment. An energy-saving waste water treatment method which does not require the use of the stirring means is also demanded in the field of waste water treatment.

Nowadays, recycling of resources is an important theme. The silicon sludge derived from the silicon waste water generated in the semiconductor factory is effective for increasing the settling performance, or sedimentation property, of activated sludge derived from domestic waste water or the like. Therefore, utilization of the silicon sludge as the settling agent of the activated sludge is conceivable.

However, in the semiconductor factories, the scale of the existing waste water treatment equipment utilizing the activated sludge is not large enough to recycle the silicon sludge sufficiently. To utilize the silicon sludge generated in the semiconductor factories for factories of different fields, it is necessary to transport the silicon sludge, which incurs costs.

Accordingly, it would be advantageous to utilize the silicon sludge generated in a waste water treatment system of a semiconductor factory for a different waste water treatment system of the same factory. It would also be advantageous to utilize acid waste water and alkali waste water effectively in addition to the silicon waste water.

As described above, in the conventional fluorine waste water treatment methods, experimentally, treated water having an intended quality cannot be obtained without using a large amount of calcium agent such as calcium hydroxide and a large amount of flocculating agent. Thus, sludge generated in the conventional fluorine waste water treatment process contains unreacted calcium hydroxide and unreacted flocculating agent. This is not rational from the viewpoint of effective utilization of resources. Accordingly, there is a demand for the development of a waste water treatment system which can utilize the calcium hydroxide and the flocculating agent effectively and completely.

Further, it would be a great convenience if a fluorine waste water treatment system can treat both fluorine waste water and ground water containing organic chlorides of topical interest. In this case, it is unnecessary to install new equipment, which is rational.

In the waste water treatment method which is disclosed in Japanese Patent Application Laid-Open No. 10-11369, to treat organic chlorides (polluting substance) such as, for example, carbon tetrachloride and tetrachloroethylene, silicon is added to a polluted environment to accelerate the dechlorination reaction of the organic chlorides to thereby decompose them. That is, this method requires the addition of silicon to the polluted environment. But, if the polluted environment is soil, it is difficult to permeate silicon into the entire polluted environment. Further, if the soil is large, it is necessary to use a large amount of silicon. Thus, this method is not a practical method.

SUMMARY OF THE INVENTION

Therefore, an object of the present invention is to provide a waste water treatment method and apparatus which can reduce electric power consumption and the amount of chemical agents needed as much as possible to achieve savings of energy and effectively utilize resources. chemical agents as much as possible, achieve saving of energy, and effectively utilize resources.

In order to accomplish the object, a waste water treatment method according to an aspect of the present invention neutralizes acid waste water with alkali sludge without using stirring power.

In this waste water treatment method, the acid waste water is neutralized with the alkali sludge. Neutralization treatment is generally considered to be a treatment of the acid waste water by adding an alkali agent thereto and stirring it. However, neutralization of the acid waste water can be also accomplished, without using a stirring power, by introducing the acid waste water into a tank in which a great deal of alkali sludge is present.

In the case where the alkali sludge contains unreacted chemical agent (calcium hydroxide or the like), the acid waste water is neutralized by the chemical agent. Thereby, the unreacted chemical agent is recycled. Because normally, a residence (reaction) time period is short in a reaction tank, unreacted chemical agent is necessarily contained in the sludge.

When the acid waste water is fluorine waste water, and the unreacted chemical agent is a calcium agent, fluorine in the fluorine waste water and calcium in the calcium agent chemically react with each other to form calcium fluoride. In this manner, fluorine in the waste water is treated.

If the calcium agent comprises calcium hydroxide, a waste water treatment system can be easily constructed. Further, calcium reacts with fluorine smoothly in solution if calcium derived from calcium hydroxide is used. In this connection, other calcium compounds such as $CaCO_3$ exist as large grains or Lumps like stones and thus are hardly soluble. To contrast, because the calcium hydroxide is powdery, it is soluble.

In the case where the unreacted chemical agent comprises a flocculating agent in addition to the calcium hydroxide, the flocculating agent flocculates fine particles of calcium fluoride, which has been formed by the reaction of the fluorine contained in the fluorine waste water and the calcium of the calcium hydroxide, into large flocs.

If polychlorinated aluminum, aluminum sulfate (sulfuric acid band) or macromolecular flocculant is used as the flocculating agent, a waste water treatment system can be easily designed or constructed. The macromolecular flocculant can make large flocs larger and stable.

If return sludge is used as the alkali sludge for neutralizing the acid waste water, it is easy to secure the alkali sludge in the waste water treatment system. Further, it is unnecessary to obtain the alkali sludge from different waste water treatment equipment. Further, the return sludge is not so expensive as a chemical agent is.

In the case where the alkali sludge contains silicon, it is possible to form sludge that is firm and settles favorably even though the alkali sludge is light and fluffy.

Japanese Patent Publication No. 2720830 teaches how to accelerate the settling performance of activated sludge in a fluidized state by utilizing silicon. In contrast, utilization of silicon according to the present invention is intended to change stationary sludge into strong and firm sludge (change only the property of the stationary sludge). Thus, the present invention is fundamentally different from the content of this patent publication. That is, use of silicon according to the Japanese Patent Publication No. 2720830 is intended to enhance the settling performance of the activated sludge, whereas use of silicon according to the present invention is intended to allow a sludge zone to be strong and firm, in addition to the enhancement of the settling performance of the sludge. Because silicon is heavy, it is possible to proceed neutralization and reaction reliably by introducing the acid waste water little by little into a lower portion of the strong and firm sludge zone.

In a waste water treatment apparatus according to another aspect of the present invention, waste water is treated in a main treatment tank into which return sludge and silicon sludge are introduced from an upper portion thereof and fluorine waste water is introduced from a lower portion thereof. That is, the direction in which the return sludge and the silicon sludge are introduced is opposite to the direction in which the fluorine waste water is introduced. Further, the return sludge and the silicon sludge contain a large amount of a solid matter, respectively. Accordingly, the fluorine waste water does not pass the main treatment tank in a short period of time and thus reaction can proceed reliably.

Recycling of silicon can be achieved by utilizing silicon sludge coming from a different waste water treatment system in which the silicon sludge is obtained by subjecting silicon waste water to either a coagulation and settling process or a membrane separation process.

In one embodiment, the waste water treatment apparatus comprises an introduction tank in which fluorine waste water is mixed with ground water containing an organic chloride, and the mixture is introduced into the main tank.

In this case, silicon metal contained in the silicon sludge acts on the organic chlorine compound or chloride contained in the ground water to dechlorinate the organic chloride for decomposition. Also, unreacted chemical agents contained in the return sludge treat fluorine contained in the waste water.

The silicon sludge to be introduced into the main tank may be silicon sludge obtained by treating silicon waste water by either a coagulation and settlement device having a magnet or a membrane separator having a magnet.

Because of the magnet, neither the coagulation and settlement device nor the membrane separator will hardly clog even if the silicon sludge concentration becomes high. Accordingly, reliability of the waste water treatment system can be improved.

In this connection, passage of the sludge through a magnetic field generated by the magnet prevents a pipe or the like of the waste water treatment apparatus from being clogged with the sludge and thus from becoming scaly. The magnet used in the waste water treatment apparatus may be a permanent magnet having a high intensity. Then, Si (silica) is ionized and thus the solidified silicon sludge can be decomposed.

The membrane separator may be constructed of a ultrafiltration membrane so that a waste water treatment system can be easily constructed. Silicon particles having a diameter of more than 0.5 microns can be separated by selecting a ultrafiltration membrane having a pore diameter of 0.5 microns. Many types of ultrafiltration membranes commercially available have a pore diameter of 0.5 microns.

The present invention also provides a waste water treatment apparatus, comprising:

an introduction tank into which fluorine waste water is introduced;

a main treatment tank having an upper part into which return sludge fed from a settling tank and silicon sludge fed from a different waste water treatment system are introduced and a lower part into which the fluorine waste water is introduced from the introduction tank;

a calcium hydroxide tank into which waste water is introduced from the main treatment tank and in which calcium hydroxide is added to the waste water;

a polychlorinated aluminum tank into which waste water is introduced from the calcium hydroxide tank and in which polychlorinated aluminum is added to the waste water;

a macromolecular flocculant tank into which waste water is introduced from the polychlorinated aluminum tank and in which a macromolecular flocculant is added to the waste water; and the settling tank into which waste water is introduced from the macromolecular flocculant tank and in which the waste water is separated into solid and liquid components.

In this waste water treatment apparatus, initially, calcium of unreacted calcium hydroxide reacts with fluorine in the fluorine waste water to form calcium fluoride (primary treatment of fluorine) in the main treatment tank. Secondly, in the calcium hydroxide tank, calcium hydroxide is added to the waste water to react with the fluorine remaining in the waste water into calcium fluoride (secondary treatment of fluorine). Then, in the polychlorinated aluminum tank, polychlorinated aluminum is added to the waste water to flocculate particles of calcium fluoride formed by the secondary treatment into flocs. Then, in the macromolecular flocculant tank, the macromolecular flocculant is added to the waste water to enlarge the flocs such that the flocs can settle easily. Then, the waste water being treated is introduced into the settling tank to be separated into solid and liquid components. Due to the improved settling property of the flocs, sludge that settles and the supernatant liquid can be reliably separated from each other. In this manner, fluorine contained in the waste water is treated securely and thus treated water is stably obtained.

The present invention also provides a waste water treatment apparatus, comprising:

an introduction tank into which fluorine waste water is introduced;

a main treatment tank having an upper part into which return sludge fed from a concentration tank and silicon sludge fed from a different waste water treatment system are introduced and a lower part into which the fluorine waste water is introduced from the introduction tank;

a calcium hydroxide tank into which waste water is introduced from the main treatment tank and in which calcium hydroxide is added to the waste water;

a polychlorinated aluminum tank into which waste water is introduced from the calcium hydroxide tank and in which polychlorinated aluminum is added to the waste water;

a macromolecular flocculant tank into which waste water is introduced from the polychlorinated aluminum tank and in which a macromolecular flocculant is added to the waste water;

a settling tank into which waste water is introduced from the macromolecular flocculant tank and in which the waste water is separated into solid and liquid components; and the concentration tank for concentrating settled sludge fed from the settling tank.

In this apparatus, both return sludge from the concentration tank and silicon sludge from the waste water treatment equipment of a different line are introduced into the upper part of the main treatment tank. Accordingly, as compared with the case in which return sludge comes from the settling tank, a firmer sludge zone is formed in the main treatment tank. Thus, reliable treatment can be accomplished.

The return sludge may be fed both from the concentration tank and the settling tank to the main treatment tank. In this case, much sludge is returned to the main treatment tank. Thus, the fluorine waste water can be treated even when the waste water has a very high concentration or the amount thereof is large.

The present invention also provides a waste water treatment apparatus comprising:

an anaerobic tank which contains a calcium carbonate mineral and has a separation part for separating the calcium carbonate mineral and treated water from each other an into which return sludge is introduced; and and aerobic tank which contains a calcium carbonate mineral and has a separation part for separating the calcium carbonate mineral and treated water from each other and into which silicon sludge and return sludge are introduced, and wherein fluorine waste water containing an organic matter, nitrogen, phosphorus, and/or hydrogen peroxide is treated by the anaerobic tank and the aerobic tank.

In the apparatus, fluorine contained in waste water is treated by the calcium carbonate mineral in the anaerobic tank and the aerobic tank, and organic matters contained in the waste water are biologically treated to be degraded by microorganisms that propagate in the anaerobic tank and the aerobic tank. The anaerobic tank and the aerobic tank have their respective separation parts. Thus, the calcium carbonate mineral, which has a high specific gravity, does not flow out from the anaerobic tank and the aerobic tank.

In the anaerobic tank, components contained in the return sludge react with the waste water. On the other hand, in the aerobic tank, because not only return sludge but also the silicon sludge is introduced, the sludge in the tank is heavy and firm. Thus, while the waste water is passing through the firm sludge, the components of the sludge and the components of the waste water react with each other slowly. In the anaerobic tank, hydrogen peroxide contained in the waste water is treated.

The fluorine waste water is treated in two stages by microorganisms in the anaerobic tank and in the aerobic tank. Therefore, the apparatus of the present invention is able to treat even fluorine waste water containing a hardly biodegradable surfactant.

Because in the apparatus, the sludge zone is formed in the anaerobic tank and the aerobic tank, the concentration of the sludge is high. Thus, treatment can efficiently proceed.

The present invention also provides a waste water treatment apparatus, comprising:

an anaerobic tank having an upper part providing an anaerobic sludge zone and a lower part filled with calcium carbonate mineral; and an aerobic tank which has an upper part constituting an aerobic sludge zone and a lower part filled with a calcium carbonate mineral and into which silicon sludge and returned sludge are introduced, and wherein fluorine waste water containing an organic matter, nitrogen, phosphorus, and hydrogen peroxide is treated by the anaerobic tank and aerobic tank.

In one embodiment, sludge of the anaerobic sludge zone at the upper part of the anaerobic tank contains unreacted calcium hydroxide, unreacted polychlorinated aluminum, an unreacted macromolecular flocculant, generated calcium fluoride, and microorganisms. Similarly, sludge of the aerobic sludge zone at the upper part of the aerobic tank contains unreacted calcium hydroxide, unreacted polychlorinated aluminum, an unreacted macromolecular flocculant, generated calcium fluoride, and microorganisms.

Because the sludge zone is formed both in the anaerobic tank and in the aerobic tank, the sludge concentration is high. Thus, treatment can proceed efficiently.

Phosphorus contained in the waste water is formed into fine particles of calcium phosphate by the chemical reaction with unreacted calcium hydroxide. Further, the unreacted polychlorinated aluminum and the unreacted macromolecular flocculant turn the fine particles of calcium phosphate to large flocs.

Further, because the sludge of the anaerobic sludge zone contains generated calcium fluoride, anaerobic microorganisms propagate by using the calcium fluoride as a fixing carrier on which the microorganisms are fixed. Accordingly, hydrogen peroxide in the waste water can be efficiently treated.

In the aerobic tank, a slight amount of fluorine contained in the waste water is turned to calcium fluoride by the reaction with calcium hydroxide, and phosphorus is treated as calcium phosphate. Further, organic matters are treated by aerobic microorganisms. Furthermore, because aerobic microorganisms are present in the aerobic sludge zone, ammoniacal nitrogen and nitrite nitrogen are oxidized to nitrate nitrogen.

For the purpose of denitrification, the fluorine waste water is introduced into the anaerobic tank first and then to the aerobic tank. Nitrate nitrogen contained in the waste water can be treated as nitrogen gas by anaerobic microorganisms that propagate in the anaerobic sludge zone of the anaerobic tank, and using an organic matter in the waste water as a hydrogen donor. Because the microorganisms in the aerobic sludge zone of the aerobic tank is aerobic, ammoniacal nitrogen and nitrite nitrogen contained in the waste water can be oxidized to nitrate nitrogen. The ammoniacal nitrogen and nitrite nitrogen will be returned to the anaerobic tank to be finally treated as nitrogen gas. In this way denitrification is achieved.

The present invention further provides a waste water treatment apparatus comprising:

an introduction tank into which fluorine waste water containing an organic matter, nitrogen, phosphorus, and/or hydrogen peroxide is introduced;

an anaerobic tank containing calcium carbonate mineral, into which waste water from the introduction tank and return sludge are introduced;

an aerobic tank having a stirring means and containing a calcium carbonate mineral, into which waste water from the introduction tank, return sludge, and silicon sludge are introduced, the waste water being mixed with the return sludge and the silicon sludge;

a calcium hydroxide tank into which waste water is introduced from the aerobic tank and in which calcium hydroxide is added to the waste water;

a polychlorinated aluminum tank into which waste water is introduced from the calcium hydroxide tank and in which polychlorinated aluminum is added to the waste water;

a macromolecular flocculant tank into which waste water is introduced from the polychlorinated aluminum tank and in which a macromolecular flocculant is added to the waste water;

a settling tank into which waste water is introduced from the macromolecular flocculant tank; and a concentration tank into which a precipitated matter in the settling tank is introduced.

In one embodiment, treated water at an upper part of the settling tank is returned to an intermediate part of the anaerobic tank. In this case, nitrate nitrogen contained in the treated water in the upper part of the settling tank is removed by denitrifying microorganisms in the upper part of the anaerobic tank.

In one embodiment, ground water containing a organic chlorine compound is introduced into the introduction tank and mixed with fluorine waste water containing an organic matter, nitrogen, phosphorus, and/or hydrogen peroxide. Therefore, it is possible to treat various components, namely, the organic chlorine compound, the organic matter, the nitrogen, the phosphorus, and/or the hydrogen peroxide contained in the waste water. The organic chlorine compound is treated by the dechlorination action of silicon contained in silicon sludge introduced into the aerobic tank.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 shows the construction of a second embodiment of the waste water treatment apparatus of the present invention;

FIGS. 3A and 3B are timing charts of treatment that is performed by the waste water treatment apparatus of the second embodiment;

FIG. 7 shows the construction of a sixth embodiment of the waste water treatment apparatus of the present invention;

FIGS. 8A and 8B are timing charts of treatment that is performed by the waste water treatment apparatus of the sixth embodiment.

FIG. 9 shows the construction of a seventh embodiment of the waste water treatment apparatus of the present invention;

FIG. 10 shows the construction of an eighth embodiment of the waste water treatment apparatus of the present invention;

FIGS. 12A and 12B are timing charts of treatment that is made by the waste water treatment apparatus of the ninth embodiment.

FIG. 13 shows the construction of a tenth embodiment of the present invention;

FIG. 14 shows the construction of an 11$^{th}$ embodiment of the present invention;

FIGS. 17A and 17B are timing charts of treatment that is performed by the waste water treatment apparatus of the 13$^{th}$ embodiment.

FIG. 18 shows the construction of a 14$^{th}$ embodiment of the present invention;

FIG. 19 shows a conventional method of treating silicon waste water and fluorine waste water.

DETAILED DESCRIPTION OF THE PREFERRED EMBODIMENTS

The embodiments of the present invention will be described below with reference to the drawings.

First Embodiment

Figure 1A:
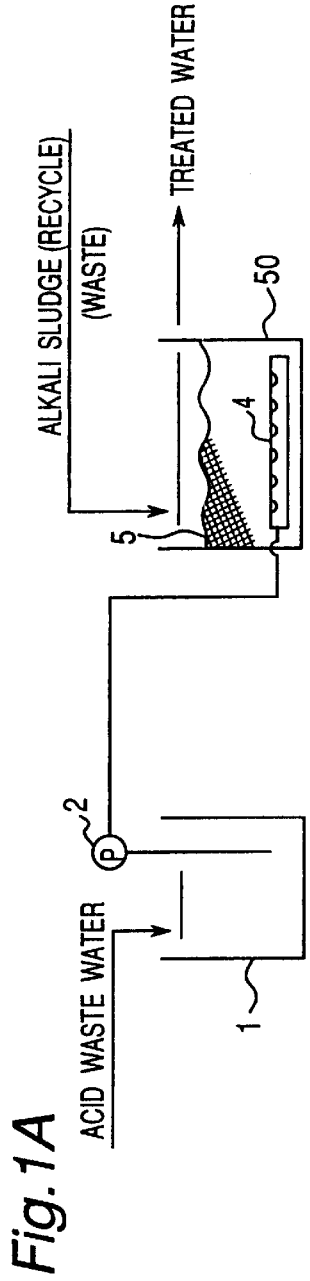
FIG. 1A shows the construction of a first embodiment (stirring power is not used) of the waste water treatment apparatus of the present invention.

FIG. 1A shows a first embodiment of the waste water treatment apparatus of the present invention. In the first embodiment, without using a stirring power, the waste water treatment apparatus neutralizes acid waste water by alkali sludge constituting an anaerobic sludge zone 5.

In the waste water treatment apparatus, initially, acid waste water is introduced into an introduction tank 1. An introduction-tank pump 2 flows the acid waste water from the introduction tank 1, through a lower inlet pipe 4 installed at a lower portion of a main treatment tank 50, to an upper part of the tank 50. The main treatment tank 50 is filled in advance with alkali sludge having a pH at 8.0–8.5 to form the anaerobic sludge zone 5 and does not have any stirring means. The weak alkali sludge having pH at 8.0–8.5 is ordinarily generated in ordinary waste water treatment equipment.

The acid waste water dissolves the alkali sludge of the anaerobic sludge zone 5, while the waste water is gradually neutralized with the alkaline component. The acid waste water can be securely neutralized by setting the residence time thereof in the main treatment tank 50 to two hours or more. In the first embodiment, the pH of the acid waste water is less than three, and the pH of treated water after neutralization treatment is set to 6 or more but 8 or less ($6 \leq pH \leq 8$). But the pH thereof is not limited to the above range.

Figure 1B:
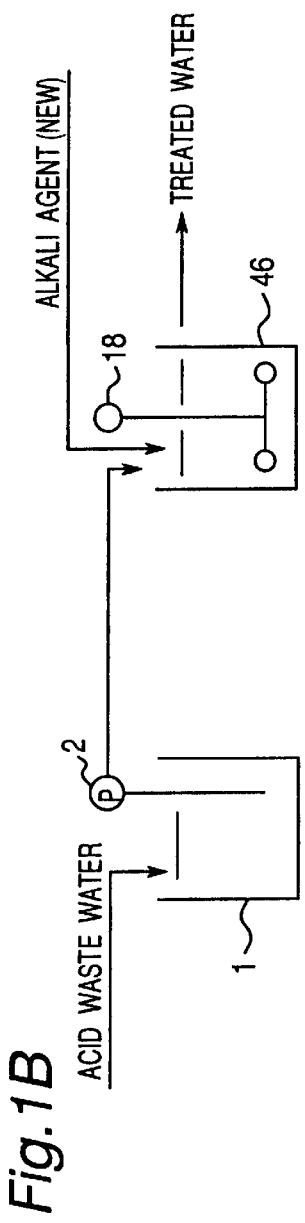
FIG. 1B shows the construction of a conventional waste water treatment apparatus for treating acid waste water by means of mechanical stirring.
Figure 1C:
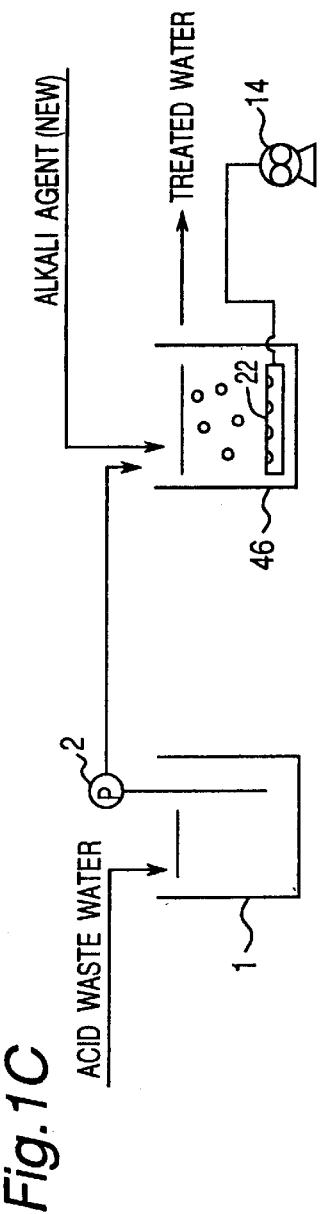
FIG. 1C shows the construction of a conventional waste water treatment apparatus for treating acid waste water by means of pneumatic stirring.

In the conventional art, as shown in FIGS. 1B and 1C, a rapid stirrer 18 or a pneumatic stirring air-diffusing pipe 22 is installed in a neutralization tank 46 to stir contents thereof mechanically or by aerating them. The air-diffusing pipe 22 of the neutralizing tank 46 shown in FIG. 10 is connected with a blower 14 through a pipe. In those days in which saving energy was not a concern, the methods as shown in FIGS. 1B and 1C have not presented problems. But in these days in which enterprises are responsible for implementing energy saving plans, a neutralization apparatus (waste water treatment apparatus), as shown in FIG. 1A, which does not require any stirring power can carry out an effective waste water treatment method which achieves energy savings.

Further, the alkali sludge that is filled in the main treatment tank 50 is changed into ordinary sludge in separate waste water treatment equipment. Thus, the neutralization treatment of the acid waste water can be accomplished while the alkali sludge is being recycled. Accordingly, the alkali sludge which is waste can be utilized, i.e., resources can be effectively utilized and chemical alkali agents can be saved. Thereby, the method shown in FIG. 1A can contribute to achievement of recycling of resources demanded nowadays.

On the other hand, the conventional neutralization methods as shown in FIGS. 1B and 1C allow the residence time period of the content in the neutralization tank to be set less than thirty minutes and thus can contribute to reduction of the initial cost. However, the short residence time period, i.e., the short reaction time period leads to flow-out of unreacted chemical agents. In particular, in the case where calcium hydroxide is used as the alkali agent, unreacted calcium hydroxide forms sludge.

Second Embodiment

FIG. 2 shows a second embodiment. The waste water treatment apparatus of the second embodiment includes a silicon waste water treatment system and a fluorine waste water treatment system. In the second embodiment, the waste water treatment system for fluorine waste water is completed by effectively utilizing an aggregate of silicon 42, namely, silicon sludge that is generated in the silicon waste water treatment system.

Initially, in the silicon waste water treatment line, the silicon waste water is introduced into a storage tank 30 and stored in the storage tank 30 for a predetermined period of time. Then, a storage-tank pump 31 introduces the silicon waste water from the storage tank 30 into a reaction tank 32 in which a rapid stirrer 18 is installed. Polychlorinated aluminum and caustic soda (not shown) are introduced into the reaction tank 32. As a result, an aggregation reaction occurs and fine particles of silicon 42 become a floc.

The particles of the silicon 42 that have become a floc flow into a settling tank 33 having a scraper 24 to form silicon sludge containing a large amount of the silicone 42. Treated water that is a supernatant liquid in the settling tank 33 flows into a storage tank 37. Then, the treated water is pumped to a prefilter 39 and a reverse osmosis film device 40 by a high-pressure pump 38 and finally introduced into an ultrapure water system 41 so that it is recycled as a raw water to be treated in the ultrapure water system 41.

On the other hand, the silicon 42 which has precipitated in the settling tank 33 becomes silicon sludge. A silicon sludge return pump 34 extracts the silicon sludge from the bottom portion of the settling tank 33 and returns it to the reaction tank 32 through a pipe on which a magnet 35 is installed. That is, the silicon sludge return pump 34 circulates the silicon sludge between the reaction tank 32 and the settling tank 33. During the circulation, the magnet 35 has a function of preventing the silicon sludge from solidifying and becoming scales in the pipe. The silicon 42 is ionized by electric energy generated as magnetic energy by the magnet 35. The ionized silicon 42 does not become a solid matter or scales in the pipe. Solid matters and scaled components in the waste water decomposed into positive ions and negative ions become flocs and are carried away by water flow.

As the magnet 35, "Super Magnex" (manufactured by ANEST and sold by Clean System Co., Ltd.) is used. Because an N-pole magnet of the "Super Magnex" and an S-pole magnet thereof can be easily fixed to the pipe, it is unnecessary to cut the pipe in installing the magnets. The "Super Magnex" is higher than other magnets in magnetic flux density (gauss) and magnetic vibration (vibration energy).

The fluorine waste water treatment system, which is a separate treatment line from the silicon waste water treatment system, has an introduction tank 1, a main treatment tank 50, a calcium hydroxide tank 17, a polychlorinated aluminum tank 19, a macromolecular flocculant tank 21, a settling tank 23, a concentration tank 26, and a filter press 29.

In the fluorine waste water treatment system, initially, fluorine waste water is introduced into the introduction tank 1. Then, the fluorine waste water is pumped into the main treatment tank 50 by an introduction-tank pump 2 through a lower inlet pipe 4 leading to a lower portion of the main treatment tank 50. Sludge returned from the settling tank 23 as well as the silicon sludge from the settling tank 33 of the silicon waste water treatment equipment is introduced into the main treatment tank 50 from an upper portion thereof.

In the main treatment tank 50, the return sludge and the silicon sludge form the anaerobic sludge zone 5. Because the return sludge form is introduced into the main treatment tank 50, the anaerobic sludge zone 5 contains calcium hydroxide, polychlorinated aluminum, and the macromolecular flocculant as unreacted chemical agents. Furthermore, because the silicon sludge is introduced into the main treatment tank 50, the anaerobic sludge zone 5 contains silicon 42 having a specific gravity higher than that of the return sludge. The silicon 42 serves to make the anaerobic sludge zone 5 firm.

At the lower portion of the anaerobic sludge zone 5 which has made firm by the silicon 42, fluorine waste water having a low pH is introduced into the main treatment tank 50. Fluorine of the fluorine waste water reacts with the unreacted chemical agents contained in the return sludge. More specifically, fluorine ions contained in the fluorine waste water reacts with calcium ions to form calcium fluoride. The calcium ions result from the calcium hydroxide in the sludge that has been dissolved by the acid fluorine waste water.

The anaerobic sludge zone 5 of the main treatment tank 50 is firm because it contains much sludge and the silicon 42. Accordingly, the fluorine waste water introduced from the introduction tank 1 into the anaerobic sludge zone 5 does not quickly pass the anaerobic sludge zone 5 before being discharged from the upper portion of the main treatment tank 50. That is, the fluorine waste water does not flow out of the main treatment tank 50 without being treated sufficiently.

Because a great deal of sludge is present in the main treatment tank 50, the acid fluorine waste water can be neutralized by the sludge and without the need of stirring power. The waste water which has flowed out from the main treatment tank 50 is introduced into the calcium hydroxide tank 17 in which calcium hydroxide is loaded. A rapid stirrer 18 is installed in the calcium hydroxide tank 17 so that unreacted fluorine is treated secondarily by the calcium hydroxide. That is, fluorine in the waste water is treated primarily by the reaction in the main treatment tank 50 and secondarily by the reaction in the calcium hydroxide tank 17.

By the addition of the calcium hydroxide to the waste water of the calcium hydroxide tank 17, remaining fluorine contained in the waste water forms fine particles of calcium fluoride. Then, the fine particles of calcium fluoride are introduced into the polychlorinated aluminum tank 19. Polychlorinated aluminum serving as an inorganic flocculating agent is introduced into the tank 19 to make the fine particles of calcium fluoride large flocs. Waste water containing the large flocs is then introduced into the macromolecular flocculant tank 21 in which a slow stirrer 20 is installed and the macromolecular flocculant is added to the waste water. Thereby, the flocs become larger, stabler, and easier to settle.

Then, the larger flocs that contain the silicon 42, and are stable and easy to settle flow into the settling tank 23 having a scraper 24 and precipitate in the settling tank 23. A supernatant liquid in the settling tank 23 is used as treated water.

The floc, namely, sludge that has precipitated in the settling tank 23 contains the silicon 42, unreacted calcium hydroxide, unreacted polychlorinated aluminum, and unreacted macromolecular flocculant. A sludge return pump 25 returns a part of the sludge that has precipitated in the settling tank 23 to the upper portion of the main treatment tank 50 through a valve 13. The remaining part of the sludge that has precipitated in the settling tank 23 is introduced into the concentration tank 26 to be concentrated, and then, pumped to the filter press 29 by the concentration tank pump 28 so as to be dehydrated.

As described above, in the second embodiment, the silicon sludge formed by the silicon waste water treatment system of the semiconductor factory is utilized to treat the fluorine waste water in the main treatment tank 50. Thus, the silicon sludge can be recycled as a waste water treatment agent, and further, the fluorine waste water can be neutralized in the main treatment tank 50 without using stirring power. Therefore, according to the second embodiment, it is possible to save resources and energy.

Because the unreacted chemical agents (calcium hydroxide, polychlorinated aluminum, and/or macromolecular flocculant) contained in the return sludge are utilized to neutralize the fluorine waste water, the unreacted chemical agents can be recycled and thus resources can be saved.

FIG. 3A shows a treatment timing in each tank of the second embodiment when the concentration of fluorine contained in the fluorine waste water is normal in the second embodiment. FIG. 3B shows a treatment timing in each tank of the second embodiment when the concentration of fluorine contained in the fluorine waste water is low in the second embodiment.

Third Embodiment

Figure 4:
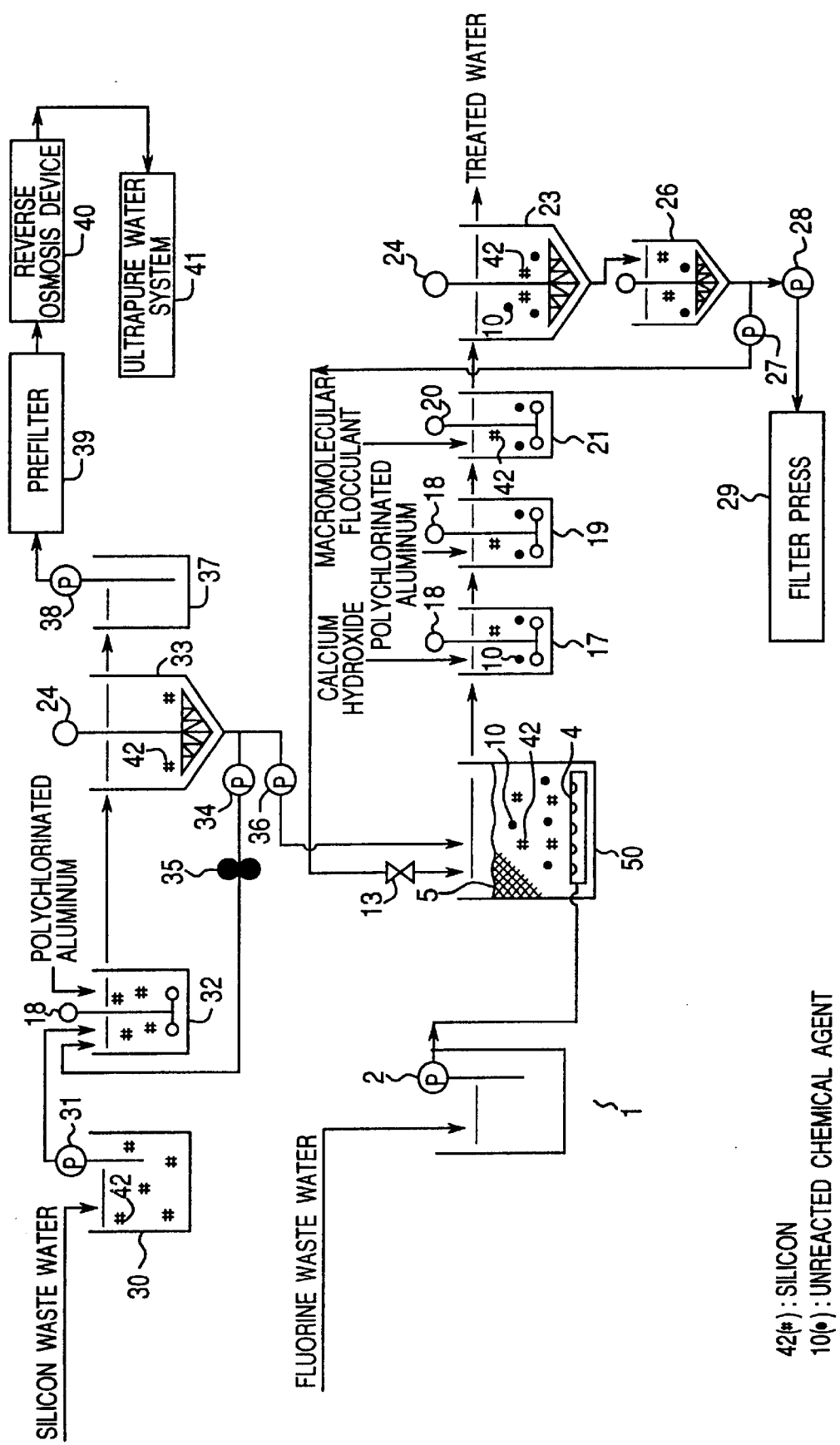
FIG. 4 shows the construction of a third embodiment of the waste water treatment apparatus of the present invention.

FIG. 4 shows a third embodiment of the waste water treatment apparatus of the present invention. The third embodiment is different from the second embodiment in that the equipment for returning the sludge that has precipitated in the settling tank 23 to the main treatment tank 50 is omitted and that the waste water treatment apparatus of the third embodiment has equipment for returning sludge that has been concentrated in the concentration tank 26 to the upper portion of the main treatment tank 5 by a concentration tank sludge return pump 27. Accordingly, the same parts as those of the first embodiment are denoted by the same reference numerals in FIG. 4, and detailed description of those parts is omitted herein.

In the third embodiment, because the sludge that has been concentrated in the concentration tank 26 is returned to the upper part of the main treatment tank 5 by the concentration tank sludge return pump 27, it is possible to return the sludge having a high concentration to the main treatment tank 50. Thus, according to the third embodiment, it is possible to stably treat the fluorine waste water having a high fluorine concentration.

Fourth Embodiment

Figure 5:
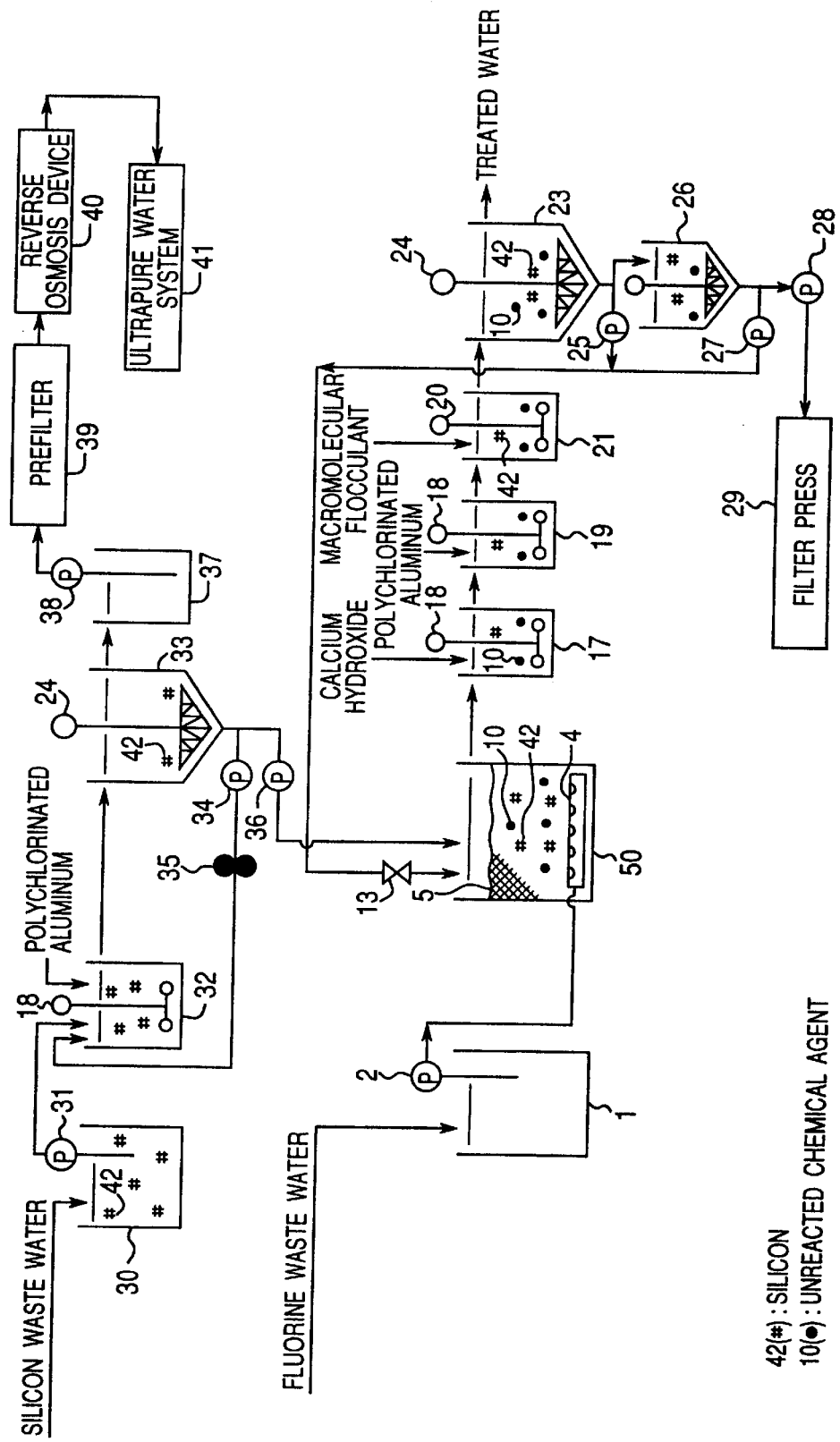
FIG. 5 shows the construction of a fourth embodiment of the waste water treatment apparatus of the present invention.

FIG. 5 shows a fourth embodiment of the waste water treatment apparatus of the present invention. The fourth embodiment is different from the second embodiment in that the waste water treatment apparatus of the fourth embodiment has equipment for returning not only the sludge which has precipitated in the settling tank 23 but also sludge which has been concentrated in the concentration tank 26 to the upper part of the main treatment tank 50. Accordingly, in FIG. 5, the same parts as those of the second embodiment are denoted by the same reference numerals, and detailed description of those parts is omitted herein.

In the fourth embodiment, the sludge which has precipitated in the settling tank 23 and the sludge which has been concentrated in the concentration tank 26 are returned to the upper part of the main treatment tank 50 by the settling tank sludge return pump 25 and the concentration tank sludge return pump 27, respectively. Accordingly, most of sludge that has been generated in the fluorine waste water treatment system is returned to the main treatment tank 50. Thus, the anaerobic sludge zone 5 is able to be formed rapidly in a trial run. Further, when the concentration of fluorine contained in the fluorine waste water becomes high suddenly, the amount of the sludge to be returned to the upper part of the main treatment tank 5 can be controlled to increase rapidly. Thus, the fluorine waste water is stably treated.

Fifth Embodiment

Figure 6:
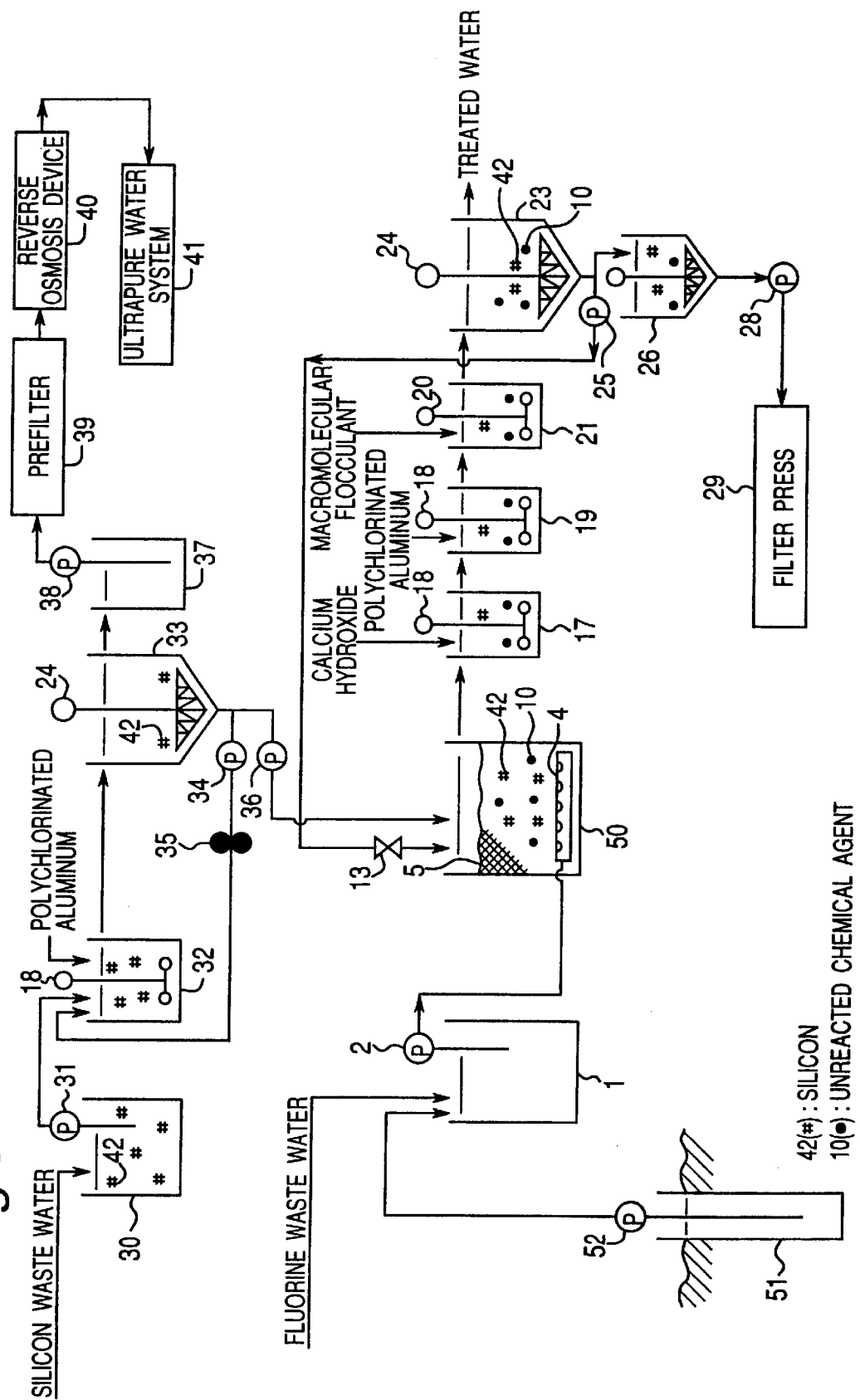
FIG. 6 shows the construction of a fifth embodiment of the waste water treatment apparatus of the present invention.

FIG. 6 shows a fifth embodiment of the waste water treatment apparatus of the present invention. The fifth embodiment is different from the second embodiment in that not only the fluorine waste water, but also ground water, drawn up from a well 51, containing an organic chlorine compound or chloride (tetrachloroethylene, etc.) is introduced into the introduction tank 1. Accordingly, same parts as those of the second embodiment are denoted by the same reference numerals and detailed description thereof is omitted herein.

In the fifth embodiment, after the ground water containing the organic chloride is introduced from a well 51 into the introduction tank 1 by a well pump 52, it is mixed with the fluorine waste water. Then the mixture is introduced into the lower part of the main treatment tank 50 by the introduction tank pump 2 and lower inlet pipe 4. In the main treatment tank 50, the silicon sludge and the return sludge are introduced simultaneously to form the anaerobic sludge zone 5. Accordingly, the organic chloride contained in the ground water is dechlorinated to finally decompose into chlorine gas and carbon dioxide gas.

The organic chlorides may be of any type and include tetrachloroethylene, trichloroethylene, and the like.

In the fifth embodiment, the organic chloride-containing ground water drawn up from the well 51 is used. But any water containing any organic chloride may also be used as well as well water or ground water.

Sixth Embodiment

FIG. 7 shows the waste water treatment apparatus of a sixth embodiment of the present invention. The sixth embodiment is different from the second embodiment in only the following points (1) and (2). Accordingly, the same parts of the sixth embodiment as those of the second embodiment are denoted by the same reference numerals and detailed description thereof is omitted herein.

(1) In the sixth embodiment, fluorine waste water containing a surfactant, nitrogen, phosphorus, and hydrogen peroxide is treated, whereas in the second embodiment, simple fluorine waste water is treated.

(2) In the sixth embodiment, an anaerobic tank 3 and an aerobic tank 15 are provided sequentially between the introduction tank 1 and the calcium hydroxide tank 17. The anaerobic tank 3 has an upper part 3-2 having the anaerobic sludge zone 5, a lower part 3-1 filled with calcium carbonate mineral 9, and a separation part 7. The aerobic tank 15 has an upper part 15-2 having an aerobic sludge zone 16, a lower part 15-1 filled with calcium carbonate mineral 9, and a separation part 7. An air-diffusing pipe 22 provided in the lower part 15-1 of the aerobic tank 15 is connected with a blower 14 to aerate the lower part 15-1 and stir a content thereof.

The sixth embodiment will be described in detail below. The waste water treatment apparatus of the sixth embodiment has a fluorine waste water treatment system constructed of the introduction tank 1, the anaerobic tank 3, the aerobic tank 15, the calcium hydroxide tank 17, the polychlorinated aluminum tank 19, the macromolecular flocculant tank 21, the settling tank 23, the concentration tank 26, and the filter press 29.

In the fluorine waste water treatment system of the sixth embodiment, the fluorine waste water containing surfactant, nitrogen, phosphorus, and hydrogen peroxide is introduced into the introduction tank 1. After waste water introduced into the introduction tank 1 is adjusted in amount and quality to a certain extent, the waste water is introduced into the lower part 3-1 of the anaerobic tank 3 through the lower inlet pipe 4, installed at the lower part 3-1 of the anaerobic tank 3, by the introduction-tank pump 2.

Sludge which has precipitated in the settling tank 23 is returned to the upper part 3-2 of the anaerobic tank 3 by the settling tank sludge return pump 25 to form the anaerobic sludge zone 5. The lower part 3-1 of the anaerobic tank 3 is filled with the calcium carbonate mineral 9. The calcium carbonate mineral 9 is placed in a weakly fluidized state by waste water discharged from the lower inlet pipe 4 into the lower part 3-1.

More specifically, the calcium carbonate mineral 9 packed in the lower part 3-1 of the anaerobic tank 3 maintains a weakly fluidized state because the calcium carbonate mineral 9 consists of calcium carbonate granules of the diameter of approximately 0.5 mm, has a specific gravity of 2.7, and is heavily loaded in the lower part 3-1 of the anaerobic tank 3. Such a weakly fluidized state can be achieved by appropriately adjusting the amount of the waste water discharged from the lower inlet pipe 4 into the lower part 3-1 of the anaerobic tank 3.

Acids, such as hydrofluoric acid, sulfuric acid, nitric acid, and phosphoric acid, contained in the fluorine waste water act on the calcium carbonate mineral 9 in the lower part 3-1 of the anaerobic tank 3, so that calcium ions elute from the calcium carbonate mineral 9. The eluted calcium ions react with fluorine contained in the waste water to form calcium fluoride 11.

The waste water to be treated here is generally discharged from semiconductor manufacturing factories or liquid crystal manufacturing factories, and the acids such as hydrofluoric acid, sulfuric acid, nitric acid, and phosphoric acid are generally used in such factories.

As described above, the sludge which has precipitated in the settling tank 23 is returned to the upper part 3-2 of the anaerobic tank 3 by the settling tank sludge return pump 25 to form the anaerobic sludge zone 5 therein. When the amount of the sludge of the anaerobic sludge zone 5 exceeds a predetermined amount, the height of the anaerobic sludge zone 5 increases and the sludge flows out of the anaerobic tank 3 through the separation chamber 7 into the aerobic tank 15. The reasons why the anaerobic sludge zone 5 is formed in the anaerobic tank 3 are that the anaerobic tank 3 does not have an aeration device, the return sludge settles favorably, and that the separation chamber 7 is provided adjacently to the upper part 3-2 of the anaerobic tank 3. The separation chamber 7 serves to prevent the calcium carbonate mineral 9 in the anaerobic sludge zone 5 from flowing out of the aerobic tank 3.

The reason for the favorable settling performance of the sludge that is returned to the anaerobic tank 3 from the settling tank 23 is that the sludge consists of silicon and the flocculating agent having a comparatively high specific gravity respectively. The sludge that precipitates in the settling tank 23 is an aggregate of the following substances (1)–(6).

(1) Calcium fluoride 11 formed by reaction of the fluorine in the waste water with the calcium carbonate mineral 9;

(2) Calcium fluoride 11 formed by reaction of fluorine in the waste water with calcium hydroxide loaded in the calcium hydroxide tank 17, and unreacted calcium hydroxide;

(3) Aluminum fluoride formed by reaction of polychlorinated aluminum loaded in the polychlorinated aluminum tank 19 with the fluorine, unreacted polychlorinated aluminum, and hydroxide (aluminum hydroxide) resulting from a large amount of the polychlorinated aluminum;

(4) Flocs formed by the macromolecular flocculent loaded in the macromolecular flocculant tank 21, and unreacted macromolecular flocculant;

(5) Microbial sludge 12 that is generated between the anaerobic tank 3 and the settling tank 23; and (6) Silicon 42 introduced from the settling tank 33 of the silicon waste water treatment system.

In the sixth embodiment, the fluorine contained in the waste water is treated primarily into the calcium fluoride 11 in the lower part 3-1 of the anaerobic tank 3, and then it is flocculated into a large floc by the unreacted calcium hydroxide, the unreacted polychlorinated aluminum, and the macromolecular flocculant in the upper part 3-2 of the anaerobic tank 3.

Nitrate nitrogen in the waste water is reduced by anaerobic microorganisms that propagate in the upper part 3-2 of the anaerobic tank 3, by using a slight amount of IPA (isopropyl alcohol) or the like in the waste water as a hydrogen donor, to form nitrogen gas for further treatment.

In semiconductor factories, a great deal of IPA is used in the manufacturing process. Thus, a slight amount of IPA is contained in waste water. Further, a great deal of hydrogen peroxide is used as an oxidant in the semiconductor factories. Thus, waste water discharged from such factories contains a lot of hydrogen peroxide. The hydrogen peroxide is treated to be decomposed into water and carbon dioxide gas by the reducing property of the anaerobic microorganisms which propagate in the upper part 3-2 of the anaerobic tank 3.

Phosphoric acid that is used in the semiconductor factory is present as phosphorus in the waste water. The upper part 3-2 of the anaerobic tank 3, the content of which is stirred by only water current, contains unreacted calcium hydroxide in the return sludge. Thus, the phosphorus in the waste water reacts with the calcium hydroxide to some extent to form calcium phosphate.

The separation chamber 7 of the anaerobic tank 3 has an inclined surface 8 at the bottom, the inclined surface extending upwardly from a region of the tank 3 where the lower inlet pipe 4 is positioned, toward an end wall of the tank 3. No lower inlet pipe is provided on the inclined surface 8. Therefore, in the separation chamber 7, the calcium carbonate mineral 9 moves downward along the inclined surface 8. Thus the calcium carbonate mineral 9 that is used as the material for treating the fluorine is prevented from flowing out of the separation chamber 7. On the other hand, the flocculated calcium fluoride 11 and the microbial sludge 12 each having a small specific gravity eventually flow out from the separation chamber 7.

The waste water treated in the anaerobic tank 3 flows into the aerobic tank 15. The aerobic tank 15 has the lower part 15-1, the upper part 15-2, and a separation chamber 7 adjacent to the upper part 15-2. Introduced into the upper part 15-2 of the aerobic tank 15 is sludge containing much silicon 42 flocculated and precipitated in the silicon waste water treatment system which is separate from this fluorine waste water treatment system. Introducing the sludge containing silicon 42 into the upper part 15-2 makes a firm and powerful aerobic sludge zone 16.

The waste water discharged from the anaerobic tank 3 is introduced into the tank 15 at a part intermediate between the lower part 15-1 and the upper part 15-2, and treated for a long time in the aerobic sludge zone 16. Sludge which has precipitated in the settling tank 23 is returned to the upper part 15-2 of the aerobic tank 15 by the settling tank sludge return pump 25 to form the aerobic sludge zone 16 containing aerobic microorganisms. The waste water from the anaerobic tank 3 is introduced into the aerobic tank 15 at its intermediate part (a lower part of aerobic sludge zone 16) so that among other reasons, organic matters such as surfactant of the waste water are decomposed by the aerobic microorganisms.

When the amount of the sludge in the aerobic sludge zone 16 exceeds a predetermined amount, the height of the aerobic sludge zone 16 increases, and the sludge is discharged from the separation chamber 7 into the calcium hydroxide tank 17.

Although the aerobic tank 15 is aerated, the aerobic sludge zone 16 is formed because the return sludge has a good settling performance and the separation chamber 7 is provided adjacently to the upper part 15-2 of the aerobic tank 15. The return sludge is formed of the silicon 42 and the flocculating agent having a high specific gravity respectively. This is why the return sludge has a favorable settling performance. The composition of the sludge that is returned from the settling tank 23 to the aerobic tank 15 is the same as that of the sludge that is returned from the settling tank 23 to the anaerobic tank 3.

An air-diffusing pipe 22 is installed in the lower part 15-1 of the aerobic tank 15. Aeration air is discharged from the air-diffusing pipe 22 and stirs the content of the aerobic tank 15.

As in the case of the lower part 3-1 of the anaerobic tank 3, the lower part 15-1 of the aerobic tank 15 is filled with calcium carbonate mineral 9. Accordingly, in the intermediate part of the aerobic tank 15 there is not only the calcium carbonate mineral 9, but also the calcium fluoride 11, microbial sludge 12, and unreacted chemical agents (calcium hydroxide, polychlorinated aluminum, macromolecular flocculant) contained in the return sludge, all of which have flowed thereto from the anaerobic tank 3, are maintained in a fluidized state and ready for reaction owing to the pneumatic stirring. The waste water discharged from the anaerobic tank 3 is introduced into the intermediate part of the aerobic tank 15 and treated.

The air-diffusing pipe 22 provided at the bottom of the lower part 15-1 of the aerobic tank 15 is connected with a blower 14 through an air pipe. As the blower 14, a root blower commercially available has been selected. As an example, when the calcium carbonate mineral 9 consisting of granules having a diameter of about 0.5 mm is adopted, the amount of air that is blown by the blower 14 per volume of 1 $m^3$ of the aerobic tank 15 is set to 30–60 ($m^3$/day).

Air blown by the air-diffusing pipe 22 places the lower part 15-1 and the upper part 15-2 having the aerobic sludge zone 16 in a weakly fluidized state. In addition, the waste water flows into the vicinity of the boundary between the upper part 15-2 and the lower part 15-1 (i.e., an intermediate part of the aerobic tank). As a result, fluorine and calcium carbonate mineral 9 contained in the waste water react with unreacted calcium hydroxide and unreacted flocculating agent to form flocculated calcium fluoride 11. In this manner, a tertiary treatment of fluorine is performed and the waste water is treated. The fluorine has been primarily treated in the lower part 3-1 of the anaerobic tank 3 and secondarily treated in the upper part 3-2 thereof.

The mechanism of the treatment in the aerobic tank 15 is as follows.

(1) Fluorine in the waste water reacts with the calcium carbonate mineral 9 and the unreacted calcium hydroxide to form flocculated calcium fluoride 11 (tertiary treatment of fluorine);

(2) The flocculated calcium fluoride 11 formed as described in the above (1) is allowed to become a large floc having a uniform configuration and good settling performance by the unreacted polychlorinated aluminum and the unreacted macromolecular flocculant;

(3) An organic matter such as the surfactant contained in the waste water is biologically treated owing to contact of the organic matter with aerobic microorganisms caused by pneumatic stirring;

(4) Ammonia nitrogen and nitrite nitrogen are oxidized by air and microorganisms to form nitrate nitrogen; and (5) Phosphorus contained in the waste water reacts with the unreacted calcium hydroxide to form calcium phosphate and then becomes a large flock with the aid of the unreacted flocculating agent.

It is desirable to design the anaerobic tank 3 and the aerobic tank 15 such that the waste water treated in the aerobic tank 15 and located at the exit of the separation chamber 7 is neutral. To be specific, when the pH of the waste water introduced into the introduction tank 1 is 3 or less, it is desirable to set the residence time period of the waste water in each of the anaerobic tank 3 and the aerobic tank 15 to two hours or more, although the residence time period thereof is different depending on the amount of the unreacted chemical agents contained in the return sludge. In this embodiment, the total residence time period of the waste water in the anaerobic tank 3 and that in the aerobic tank 15 is set to four hours.

The fluorine contained in the waste water has already undergone the primary and secondary treatments in the anaerobic tank 3. Thus, even though the amount of aeration air per volume of 1 $m^3$ of the aerobic tank 15 is about 50 $m^3$ a day, no problem occurs. As a result, the waste water treatment using the aeration air of as low as about 50 $m^3$ per volume of 1 $m^3$ of the aerobic tank 15 a day is capable of securing a predetermined fluorine-removal percentage and also electric energy savings.

Similarly to the anaerobic tank 3, the separation chamber 7 of the aerobic tank 15 has an inclined surface 8 at the bottom, the inclined surface extending upwardly from a region of the tank 15 where the air-diffusing pipe 22 is positioned, toward an end wall of the tank. No air-diffusing pipe is provided on the inclined surface 8. Therefore, in the separation chamber 7, the calcium carbonate mineral 9 moves downward along the inclined surface 8. Thus the calcium carbonate mineral 9 that is used as the material for treating the fluorine is prevented from flowing out of the separation chamber 7. On the other hand, the flocculated calcium fluoride 11 and the microbial sludge 12 each having a small specific gravity eventually flow out from the separation chamber 7.

As described above, the waste water introduced into between the lower part 15-1 and the upper part 15-2 of the aerobic tank 15 reacts with the weakly fluidized calcium carbonate mineral 9 at the boundary between the lower part 15-1 and the upper part 15-2. As a result, the concentration of fluorine is reduced to about 15 ppm and the pH of the waste water approaches to six.

The waste water introduced into the aerobic sludge zone 16 in the upper part 15-2 of the aerobic tank 15 is mixed with the return sludge which contains the unreacted calcium hydroxide, the unreacted polychlorinated aluminum, the unreacted macromolecular flocculant, and microorganisms, and the mixture is stirred. Then, the fluorine (15 ppm) contained in the waste water that has undergone the tertiary treatment reacts with the unreacted calcium hydroxide contained in the return sludge to form calcium fluoride 11. Further, the unreacted flocculating agent reduces the concentration of fluorine contained in the waste water to 10 ppm or below (biquadratic treatment of fluorine). Furthermore, the pH of the waste water approaches to neutrality.

The waste water (water to be treated) is introduced into the calcium hydroxide tank 17 after the fluorine, surfactant, phosphorus, and hydrogen peroxide contained in the waste water are treated. More specifically, the waste water treated in the aerobic tank 15 is fed to the calcium hydroxide tank 17 through an overflow pipe (not shown) provided above the separation chamber 7 of the aerobic tank 15. Treatments to be made in the calcium hydroxide tank 17 and the subsequent tanks are the same as in the second embodiment.

As compared with the second embodiment, in the sixth embodiment, the calcium carbonate mineral 9 is loaded in the lower parts 3-1 and 15-1 of the anaerobic tank 3 and the aerobic tank 15, and the residence time period of the waste water in these tanks is long. Thus microorganisms propagate preferably. Therefore, it is possible to biologically treat the organic matters including the surfactant, the hydrogen peroxide, and the nitrogen with microorganisms.

The residence time period of the waste water in the main treatment tank 50 is two hours in the second embodiment, whereas the total residence time period of the anaerobic tank 3 and the aerobic tank 15 is four hours in the sixth embodiment.

FIG. 8A shows a timing chart for treatments in each tank of the sixth embodiment when the concentration of each of surfactant, nitrogen, phosphorus, hydrogen peroxide, and fluorine is normal. FIG. 8B shows a timing chart of treatments in each tank when the concentration of each of surfactant, nitrogen, phosphorus, hydrogen peroxide, and fluorine is low.

Seventh Embodiment

FIG. 9 shows a seventh embodiment of the waste water treatment apparatus of the present invention. The seventh embodiment is different from the sixth embodiment only in that a supernatant liquid of the settling tank 23 is circularly returned to an intermediate part of the anaerobic tank 3. Accordingly, the same parts as those of the sixth embodiment are denoted by the same reference numerals in FIG. 9 and detailed description thereof is omitted herein.

Because ammonia water is used in semiconductor factories, ammoniacal nitrogen is present in waste water derived from the factories. The ammoniacal nitrogen is not treated in the anaerobic tank 3 but flows into the aerobic tank 15 in which it is oxidized by air and aerobic microorganisms into nitrate nitrogen. Accordingly, the supernatant liquid of the settling tank 23 contains nitrate nitrogen.

A large amount of the supernatant liquid containing the nitrate nitrogen is introduced into the intermediate part of the anaerobic tank 3 by a settling tank supernatant liquid circulation pump 53 so as to be denitrified by anaerobic microorganisms that propagate in the anaerobic sludge zone 5.

The reason why nitrogen is not treated in the anaerobic tank 3 is because the form of nitrogen is ammonia nitrogen, whereas the nitrate nitrogen can be treated into nitrogen gas in the anaerobic tank 3.

Eighth Embodiment

FIG. 10 shows an eighth embodiment of the waste water treatment apparatus of the present invention. The eighth embodiment is different from the seventh embodiment in that not only the fluorine waste water containing surfactant, nitrogen, phosphorus, and hydrogen peroxide, but also ground water, drawn up from the well 51, containing organic chloride or chlorine compound (tetrachloroethylene or the like) is introduced into the introduction tank 1. Accordingly, in FIG. 10, same parts as those of the seventh embodiment are denoted by the same reference numerals and detailed description thereof is omitted herein.

In the eighth embodiment, after the ground water containing organic chlorides is introduced into the introduction tank 1 by the well pump 52, it is mixed with the fluorine waste water containing surfactant, nitrogen, phosphorus, and hydrogen peroxide, and then, the mixture is introduced into the anaerobic tank 3 filled with the silicon sludge containing the silicon 42 by the introduction tank pump 2, and then, the mixture is introduced into the aerobic tank 15 filled with the silicon sludge. The organic chlorides contained in the ground water are dechlorinated into chlorine gas and carbon dioxide gas in the anaerobic tank 3 and the aerobic tank 15 filled with much silicon, respectively.

In the aforesaid fifth embodiment, the organic chlorides are treated in one tank (single-stage treatment), whereas in the eighth embodiment, the organic chlorides are treated in the anaerobic tank 3 and the aerobic tank 15 each containing the silicon 42 (two-stage treatment). Thus, the residence time period for reaction in the eighth embodiment is twice as long as that in the fifth embodiment. Accordingly, the eighth embodiment achieves a higher organic chloride removal percentage than the fifth embodiment and thus accomplishes reliable treatment.

Ninth Embodiment

Figure 11:
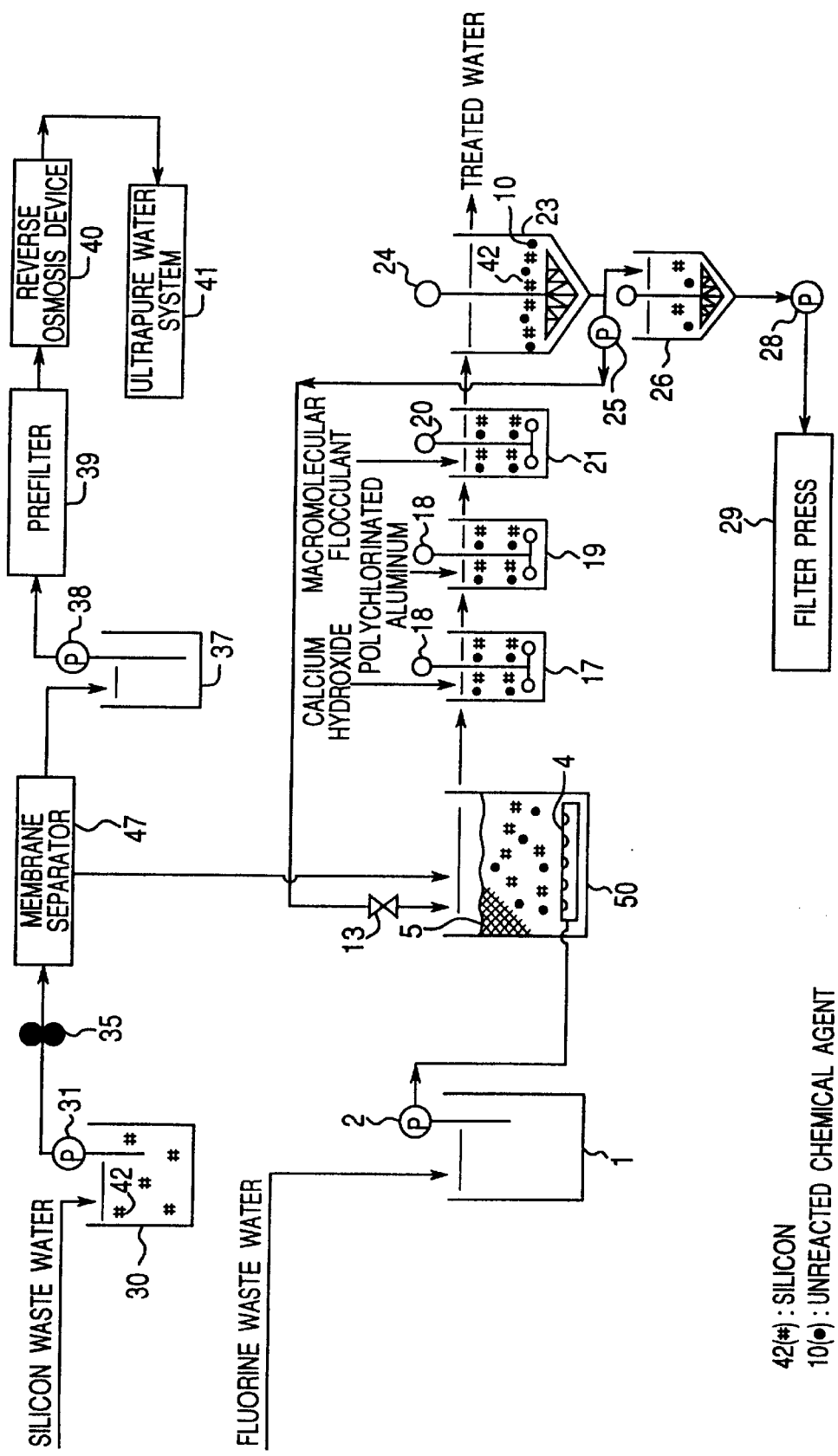
FIG. 11 shows the construction of a ninth embodiment of the present invention.

FIG. 11 shows a ninth embodiment of the waste water treatment apparatus of the present invention. The ninth embodiment is different from the second embodiment only in the construction of the silicon waste water treatment system. Accordingly, in FIG. 11, parts of the ninth embodiment that are the same as the parts of the second embodiment are denoted by the same reference numerals and detailed description thereof is omitted herein.

In the silicon waste water treatment system of the ninth embodiment, after the silicon waste water is introduced into the storage tank 30 and stored therein, it is introduced into a membrane separator 47 by the storage tank pump 31. The membrane separator 47 is constructed of an ultrafiltration membrane in the ninth embodiment, although it may be constructed of a reverse osmosis film. Magnet 35 is installed on a pipe between the storage tank pump 31 and the membrane separator 47. The magnet 35 has the function of preventing the silicon 42 from solidifying in the pipe to thereby prevent the silicon 42 from occluding and/or scaling the pipe.

As the ultrafiltration membrane, a spiral-type module manufactured by Nitto Denko Co., Ltd. is adopted. Alternatively, a planar type, a tubular type, or a hollow fiber type ultrafiltration membrane may be adopted.

Water filtrated by the membrane separator 47 is introduced into the storage tank 37. Treatments that are carried out in the storage tank 37 and the subsequent tanks are similar to the second embodiment.

Unlike the second embodiment in which the silicon 42 is separated from the silicon waste water by the coagulation and settlement method, the ninth embodiment is advantageous in that the flocculating or coagulating agent is not required and that the installation space is considerably small because the silicon 42 is separated from the silicon waste water by the membrane separation method in the ninth embodiment. On the other hand, in the membrane separation method, the membrane clogs with time and the amount of treated water decreases, which necessitates replacement of the membrane at a certain interval, depending on the silicon concentration of the silicon waste water and the particle size of the silicon 42.

FIG. 12A shows a timing chart of treatments in each tank when the concentration of fluorine is normal. FIG. 12B shows a timing chart of treatments in each tank when the concentration of fluorine is low.

Tenth Embodiment

FIG. 13 shows a tenth embodiment of the waste water treatment apparatus of the present invention. The tenth embodiment is the same as the third embodiment, except that the silicon waste water is treated not by the coagulation and settlement method but by the membrane separation method. Accordingly, in FIG. 13, parts of the tenth embodiment that are the same as the parts of the third embodiment are denoted by the same reference numerals and detailed description thereof is omitted herein.

In the silicon waste water treatment system of the tenth embodiment, the silicon waste water is treated by the membrane separation method. The treatment of the silicon waste water that is carried out by the membrane separation method is the same as that of the ninth embodiment. The 10$^{th}$ embodiment is advantageous in that it eliminates the need for the use of the flocculating agent and uses a much smaller space.

11$^{th}$ Embodiment

FIG. 14 shows an 11$^{th}$ embodiment of the waste water treatment apparatus of the present invention. The 11$^{th}$ embodiment is the same as the fourth embodiment, except that similarly to the ninth embodiment, the silicon waste water is treated not by the coagulation and settlement method but by the membrane separation method. Accordingly, in FIG. 14, parts of the 11$^{th}$ embodiment that are the same as the parts of the fourth embodiment are denoted by the same reference numerals and detailed description thereof is omitted herein.

Similarly to the ninth embodiment, the 11$^{th}$ embodiment is advantageous in that it eliminates the need for the use of the flocculating agent and uses a much smaller space.

12$^{th}$ Embodiment

Figure 15:
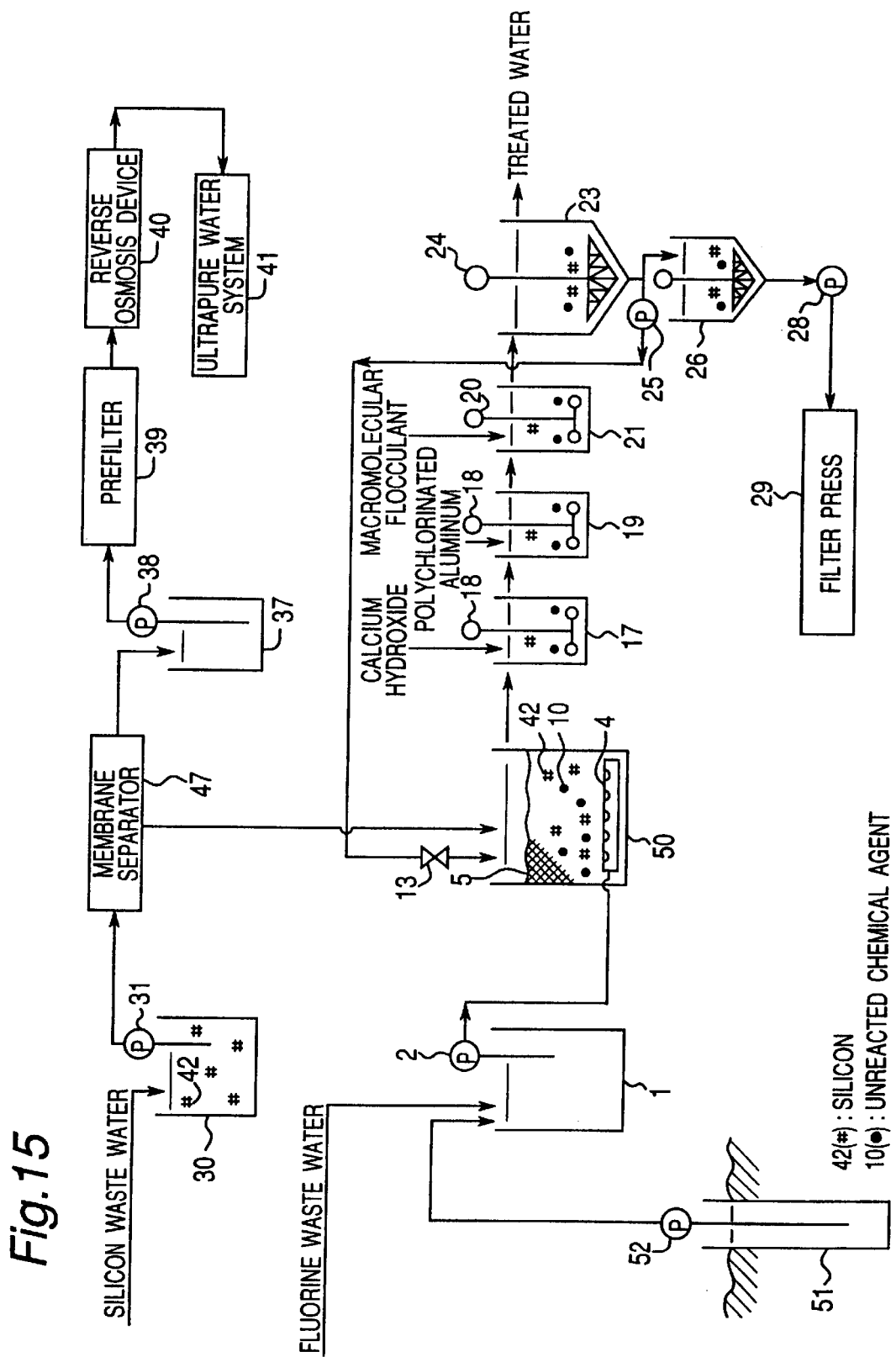
FIG. 15 shows the construction of a 12$^{th}$ embodiment of the present invention.

FIG. 15 shows a 12$^{th}$ embodiment of the waste water treatment apparatus of the present invention. The 12$^{th}$ embodiment is the same as the fifth embodiment, except that in the 12$^{th}$ embodiment, similarly to the ninth embodiment, the silicon waste water is treated not by the coagulation and settlement method but by the membrane separation method.

Similarly to the ninth embodiment, the 12th embodiment is advantageous in that it eliminates the need for the use of the flocculating agent and uses a much smaller space.

13$^{th}$ Embodiment

Figure 16:
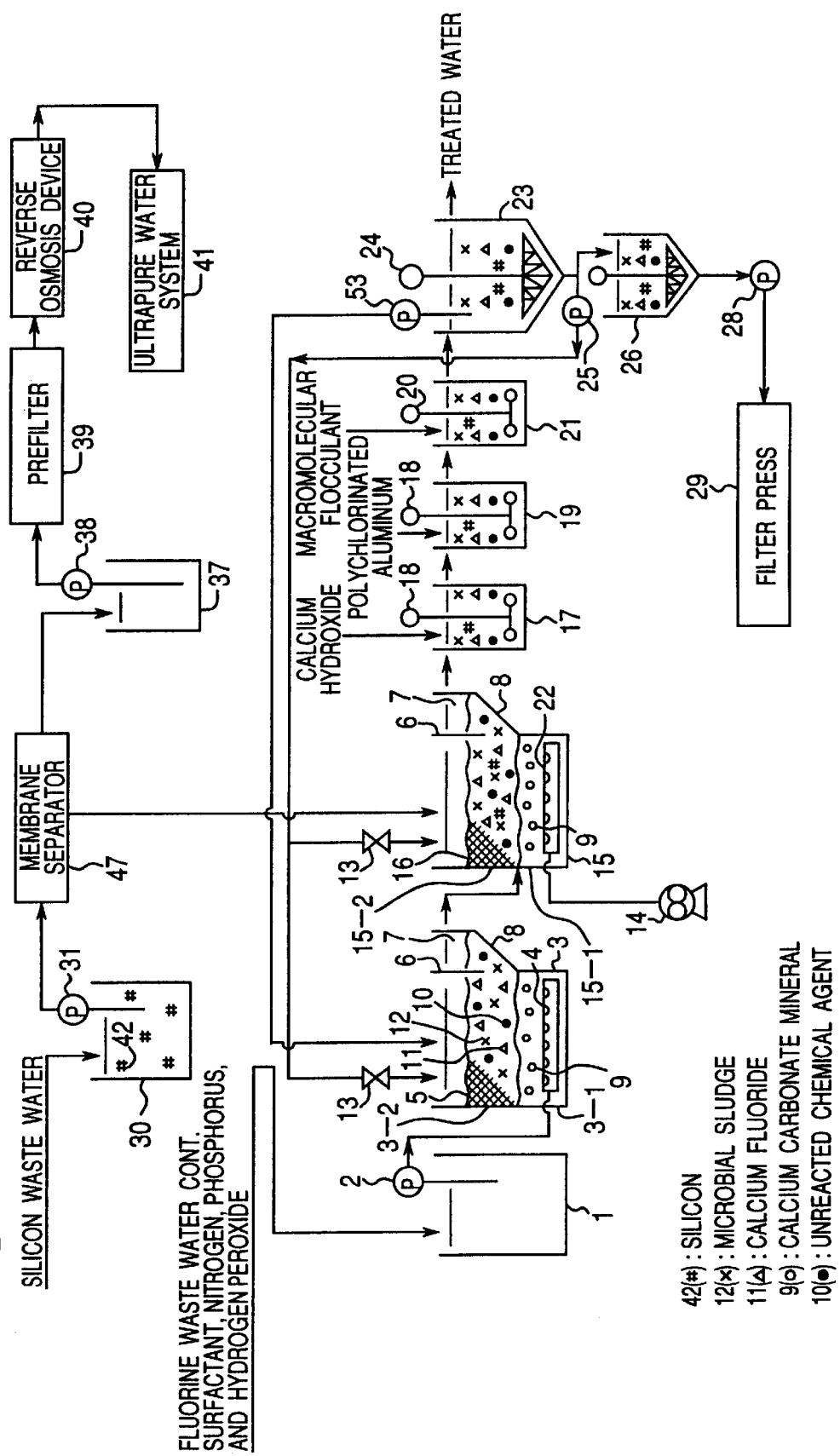
FIG. 16 shows the construction of a 13$^{th}$ embodiment of the present invention.
Figure 20:
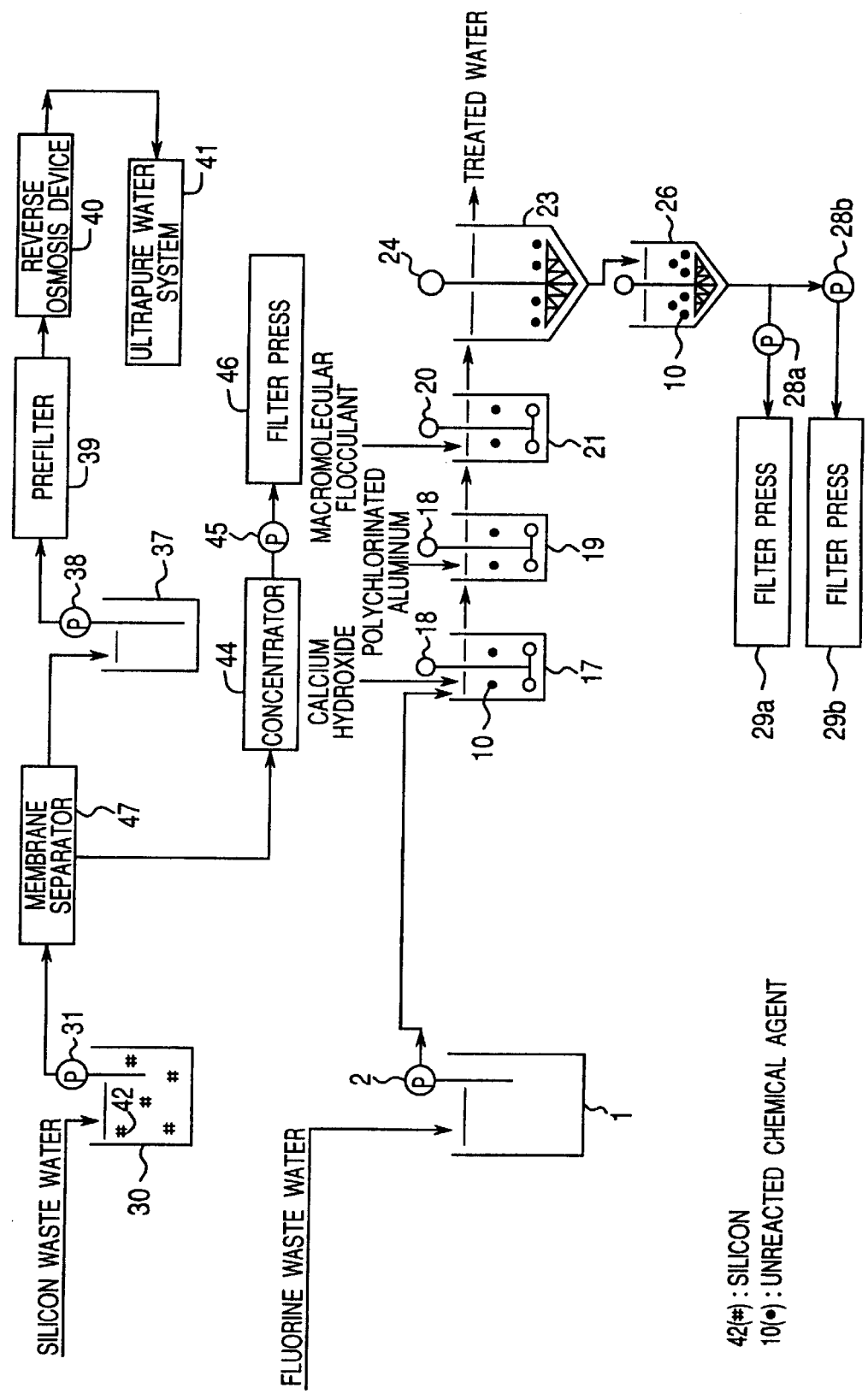
FIG. 20 shows another conventional method of treating the silicon waste water and the fluorine waste water.

FIG. 16 shows a 13$^{th}$ embodiment of the waste water treatment apparatus of the present invention. The 13$^{th}$ embodiment is the same as the sixth embodiment, except that in the 13$^{th}$ embodiment, similarly to the ninth embodiment, the silicon waste water is treated not by the coagulation and settlement method but by the membrane separation method. Accordingly, in FIG. 16, parts of the 13$^{th}$ embodiment that are the same as the parts of the sixth embodiment are denoted by the same reference numerals and detailed description thereof is omitted herein.

Similarly to the ninth embodiment, the 13$^{th}$ embodiment is advantageous in that it eliminates the need for use of the flocculating agent, or coagulant, and uses a much smaller space.

FIG. 17A shows a timing chart of treatments in each tank when the concentration of each of surfactant, nitrogen, phosphorus, hydrogen peroxide, and fluorine is normal. FIG. 17B shows a timing chart of treatments in each tank when the concentration of each of surfactant, nitrogen, phosphorus, hydrogen peroxide, and fluorine is low.

14$^{th}$ Embodiment

FIG. 18 shows a 14$^{th}$ embodiment of the waste water treatment apparatus of the present invention. The 14$^{th}$ embodiment is the same as the eighth embodiment, except that the silicon waste water is treated not by the coagulation and settlement method but by the membrane separation method. Accordingly, in FIG. 18, parts of the 14$^{th}$ embodiment that are the same as the parts of the eighth embodiment are denoted by the same reference numerals and detailed description thereof is omitted herein.

Similarly to the ninth embodiment, the 14th embodiment is advantageous in that it eliminates the need for use of the flocculating agent and uses a much smaller space.

EXAMPLE 1

An illustrative example of waste water treatment using an apparatus having the same construction as that of the first embodiment shown in FIG. 1A is described below.

In this example, the introduction tank 1 had a capacity of about 300 m$^3$ and the main treatment tank 50 had a capacity of about 600 m$^3$. As a result of treatment of waste water at the pH of 2.1 and a fluorine concentration of 163 ppm by using the apparatus, the pH of the treated waste water was increased to 7.3 and the fluorine concentration was decreased to 7 ppm.

EXAMPLE 2

An illustrative example of waste water treatment using an apparatus having the same construction as that of the second embodiment shown in FIG. 2 is described below.

In this example, the storage tank 1 had a capacity of about 300 m$^3$, the main treatment tank 50 had a capacity of about 600 m$^3$, the calcium hydroxide tank 17 had a capacity of about 100 m$^3$, and the polychlorinated aluminum tank 19 had a capacity of about 100 m$^3$. Also, the macromolecular flocculant tank 21 had a capacity of about 100 m$^3$, the settling tank 23 had a capacity of about 900 m$^3$, and the concentration tank 26 had a capacity of about 100 m$^3$.

On the other hand, in the silicon waste water treatment system separate from the fluorine waste water treatment system, the storage tank 30 had a capacity of about 100 m$^3$, the reaction tank 32 had a capacity of about 100 m$^3$, the settling tank 33 had a capacity of about 600 m$^3$, and the storage tank 37 had a capacity of about 100 m$^3$.

As a result of treatment of waste water at a pH of 2.2 and a fluorine concentration of 155 ppm by using the apparatus, the pH of the treated water was 7.3 and the fluorine concentration was 6 ppm.

EXAMPLE 3

An experimental example of waste water treatment using an apparatus having the same construction as that of the sixth embodiment shown in FIG. 7 is described below. In the experiment, the tanks in the fluorine waste water treatment system or line had the following capacities: the storage tank 1 had a capacity of about 150 m$^3$, the anaerobic tank 3, about 300 m$^3$, the aerobic tank 15, about 300 m$^3$, the calcium hydroxide tank 17, about 50 m$^3$, the polychlorinated aluminum tank 19, about 50 m$^3$, the macromolecular flocculant tank 21, about 50 m$^3$, the settling tank 23, about 450 m$^3$, and the concentration tank 26, about 100 m$^3$. On the other hand, in the separate silicon waste water treatment line, the storage tank 30 had a capacity of about 100 m$^3$, the reaction tank 32, about 100 m$^3$, the settling tank 33, about 600 m$^3$, and the storage tank 37, about 100 m$^3$.

Fluorine waste water containing surfactant, nitrogen, phosphorus, and hydrogen peroxide was treated by the apparatus. As a result of the treatment, the pH of the water was changed from 2.3 to 7.5 and the fluorine concentration was decreased from 161 ppm to 6 ppm. Further, the anionic surfactant concentration was reduced from 0.12 ppm to 0.06 ppm, the total nitrogen concentration was reduced from 12.3 ppm to 5.1 ppm, the phosphorus concentration was reduced from 8.2 ppm to 0.3 ppm, and the hydrogen peroxide concentration was reduced from 72 ppm to 0.5 ppm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A waste water treatment method for treating fluorine waste water, said method comprising;
    subjecting silicon waste water, in a separate waste treatment system, to a coagulation and settling process, or a membrane separation process, to produce an alkaline silicon sludge;
    introducing recycled sludge and silicon sludge from said separate waste treatment system into an upper portion of a main treatment tank to form an alkaline sludge zone; and
    introducing acidic fluorine waste water, through a lower inlet pipe located at a lower portion of the main treatment tank, for neutralizing said fluorine waste water with the alkaline sludge zone thereby obviating any need for an electrically powered stirrer or aerator.

2. The waste water treatment method according to claim 1, said method further comprising receiving silicon waste water, polychlorinated aluminum and caustic soda, in a reaction tank of said separate waste water treatment system, to form a floc; and
    receiving the floc, from said reaction tank, in a settling tank and forming said silicon sludge.

3. The waste water treatment method according to claim 1, said method further comprising mixing fluorine waste water with ground water containing an organic chloride in an introduction tank, and the mixture being introduced into the main tank through the lower inlet pipe.

4. The waste water treatment method according to claim 1, wherein the silicon sludge is obtained by treating silicon waste water by either a coagulation and settlement device having a magnet or a membrane separator having a magnet.

5. The waste water treatment method according to claim 4, wherein the membrane separator comprises an ultrafiltration membrane.

6. A waste water treatment method, comprising:
    subjecting silicon waste water to a coagulation and settling process, or a membrane separation process, in a separate waste treatment system, to produce an alkaline silicon sludge;
    introducing acidic fluorine waste water in an introduction tank;
    introducing return sludge, from a second settling tank, and the silicon sludge, from said separate waste treatment system, into an upper part of a main treatment tank to form an alkaline sludge zone;
    introducing the fluorine waste water, from the introduction tank, into the main treatment tank via a lower inlet pipe located at a lower portion of the main treatment tank for neutralizing said fluorine waste water with the alkaline sludge zone thereby obviating any need for an electrically powered stirrer or aerator;
    introducing waste water from the main treatment tank to a calcium hydroxide tank and adding calcium hydroxide to the waste water;
    introducing waste water from the calcium hydroxide tank to a polychlorinated aluminum tank and adding polychlorinated aluminum to the waste water;
    introducing waste water from the polychlorinated aluminum tank to a macromolecular flocculant tank and adding a macromolecular flocculant to the waste water; and
    introducing waste water from the macromolecular flocculant tank to the second settling tank and separating the waste water into solid and liquid components.

7. The waste water treatment method according to claim 6, said method further comprising:
    receiving silicon waste water, polychlorinated aluminum and caustic soda to form a floc in a reaction tank of said separate waste water treatment system; and
    receiving the floc from said reaction tank in a second settling tank and forming said silicon sludge.

8. A waste water treatment method, comprising:
    subjecting silicon waste water to a coagulation and settling process, or a membrane separation process, in a separate waste treatment system, to produce an alkaline silicon sludge;
    introducing acidic fluorine waste water into an introduction tank;
    introducing return sludge from a concentration tank and the silicon sludge from said separate waste treatment system into an upper part of a main treatment tank to form an alkaline sludge zone;
    introducing the fluorine waste water, from the introduction tank, into the main treatment tank via a lower inlet pipe located at a lower portion of the main treatment tank for neutralizing said fluorine waste water with the alkaline sludge zone thereby obviating any need for an electrically powered stirrer or aerator;
    introducing waste water from the main treatment tank to a calcium hydroxide tank and adding calcium hydroxide to the waste water;
    introducing waste water from the calcium hydroxide tank to a polychlorinated aluminum tank and adding polychlorinated aluminum to the waste water;
    introducing waste water from the polychlorinated aluminum tank to a macromolecular flocculant tank and adding a macromolecular flocculant to the waste water;
    introducing waste water from the macromolecular flocculant tank to a settling tank and separating the waste water into solid and liquid components; and
    concentrating settled sludge fed from the settling tank in the concentration tank.

9. The waste water treatment method according to claim 8, wherein in addition to the return sludge fed from the concentration tank, return sludge fed from the settling tank is introduced into the upper part of the main treatment tank.

10. The waste water treatment method according to claim 8, said method further comprising:
    receiving silicon waste water, polychlorinated aluminum and caustic soda to form a floc in a reaction tank of said separate waste water treatment system; and
    receiving the floc from said reaction tank in a second settling tank and forming said silicon sludge.

11. A waste water treatment method comprising:
    subjecting silicon waste water to a coagulation and settling process, or a membrane separation process, in a separate waste treatment system, to produce an alkaline silicon sludge;
    forming an anaerobic sludge zone without the use of any electrically powered aeration device in an anaerobic tank which contains calcium carbonate mineral, a lower inlet pipe at a lower part of the anaerobic tank and a separation part for separating the calcium carbonate mineral and treated water from each other, return sludge being introduced at a top portion of the anaerobic tank;
    using an aerobic tank which contains calcium carbonate mineral and a separation part for separating the calcium carbonate mineral and treated water, received from the anaerobic tank, from each other; and introducing silicon sludge from said separate waste treatment system and return sludge into an upper part of the aerobic tank to form an alkaline silicon sludge zone, wherein acidic fluorine waste water containing an organic matter, nitrogen, phosphorus, and/or hydrogen peroxide, introduced into the lower portion of the anaerobic tank through the lower inlet pipe, is treated by the anaerobic tank and the aerobic tank, and neutralized in said alkaline silicon sludge zone.

12. The waste water treatment method according to claim 11, wherein the organic matter contained in the fluorine waste water is a surfactant which has a low biodegradability.

13. The waste water treatment method according to claim 11, said method further comprising:

receiving silicon waste water, polychlorinated aluminum and caustic soda to form a floc in a reaction tank of said separate waste water treatment system; and receiving the floc from said reaction tank in a settling tank and forming said silicon sludge.

14. A waste water treatment method comprising:

subjecting silicon waste water to a coagulation and settling process, or a membrane separation process, in a separate waste treatment system, to produce an alkaline silicon sludge;

introducing silicon sludge from said separate waste treatment system and return sludge into an upper part of an aerobic tank, which has an upper part constituting an aerobic sludge zone and a lower part filled with calcium carbonate mineral, to form an alkaline silicon sludge zone, wherein acidic fluorine waste water, containing an organic matter, nitrogen, phosphorus, and/or hydrogen peroxide, being introduced into a lower portion of an anaerobic tank having an upper part providing an anaerobic sludge zone, a lower part filled with calcium carbonate mineral and a lower inlet pipe, said anaerobic tank not having any electrically powered aeration device and said fluorine waste water being treated by the anaerobic tank and the aerobic tank, and neutralized in said alkaline silicon sludge zone.

15. The waste water treatment method according to claim 14, wherein sludge of the anaerobic sludge zone at the upper part of the anaerobic tank contains unreacted calcium hydroxide, unreacted polychlorinated aluminum, an unreacted macromolecular flocculant, generated calcium fluoride, and microorganisms; and sludge of the anaerobic sludge zone at the upper part of the aerobic tank also contains unreacted calcium hydroxide, unreacted polychlorinated aluminum, an unreacted macromolecular flocculant, generated calcium fluoride, and microorganisms.

16. The waste water treatment method according to claim 15, wherein waste water is introduced first into the anaerobic tank and then to the aerobic tank;

the microorganisms in the anaerobic sludge zone of the anaerobic tank are anaerobic microorganisms; and the microorganisms in the aerobic sludge zone of the aerobic tank are aerobic microorganisms.

17. The waste water treatment method according to claim 14, said method further comprising:

receiving silicon waste water, polychlorinated aluminum and caustic soda to form a floc in a reaction tank of said separate waste water treatment system; and receiving the floc from said reaction tank in a settling tank and forming said silicon sludge.

18. A waste water treatment method comprising:

subjecting silicon waste water to a coagulation and settling process, or a membrane separation process, in a separate waste treatment system, to produce an alkaline silicon sludge;

introducing acidic fluorine waste water containing an organic matter, nitrogen, phosphorus, and/or hydrogen peroxide to an introduction tank;

introducing waste water from the introduction tank and return sludge through a lower inlet pipe located at a lower part of an anaerobic tank containing calcium carbonate mineral, said anaerobic tank not having any electrically powered aeration device;

introducing waste water from the introduction tank into an aerobic tank having a stirring means and containing calcium carbonate mineral;

introducing return sludge, and silicon sludge from said separate waste treatment system into an upper part of the aerobic tank to form an alkaline silicon sludge zone, the waste water being mixed with the return sludge and the silicon sludge, to neutralize said fluorine waste water;

introducing waste water from the aerobic tank into a calcium hydroxide tank and adding calcium hydroxide to the waste water;

introducing waste water from the calcium hydroxide tank into a polychlorinated aluminum tank and adding polychlorinated aluminum to the waste water;

introducing waste water from the polychlorinated aluminum tank into a macromolecular flocculant tank and adding a macromolecular flocculant to the waste water;

introducing waste water from the macromolecular flocculant tank into a settling tank; and introducing a precipitated matter in the settling tank into a concentration tank.

19. The waste water treatment method according to claim 18, wherein treated water at an upper part of the settling tank is returned to an intermediate part of the anaerobic tank.

20. The waste water treatment method according to claim 18, wherein ground water containing an organic chloride is introduced into the introduction tank and mixed with the fluorine waste water so that the organic chloride is also treated.

21. The waste water treatment method according to claim 18, said method further comprising:

receiving silicon waste water, polychlorinated aluminum and caustic soda to form a floc in a reaction tank of said separate waste water treatment system; and receiving the floc from said reaction tank in a settling tank and forming said silicon sludge.

* * * * *